(12) United States Patent
Jirsa et al.

(10) Patent No.: US 8,894,200 B2
(45) Date of Patent: Nov. 25, 2014

(54) INNOVATIVE AND AESTHETIC ALTERNATIVE TO TRADITIONAL SPECTACLE CORRECTION

(75) Inventors: Jaclyn L. Jirsa, New York, NY (US); Roy P. Prosise, Cedar Park, TX (US)

(73) Assignee: Addo Industries, LLC, New York, NY (US)

( * ) Notice: Subject to any disclaimer, the term of this patent is extended or adjusted under 35 U.S.C. 154(b) by 344 days.

(21) Appl. No.: 13/172,483

(22) Filed: Jun. 29, 2011

(65) Prior Publication Data

US 2012/0002158 A1    Jan. 5, 2012

Related U.S. Application Data

(60) Provisional application No. 61/360,314, filed on Jun. 30, 2010.

(51) Int. Cl.
```
G02C 5/20      (2006.01)
G02C 11/02     (2006.01)
G02C 3/00      (2006.01)
G02C 1/02      (2006.01)
```
(52) U.S. Cl.
CPC .. *G02C 1/02* (2013.01); *G02C 5/20* (2013.01); *G02C 2200/08* (2013.01); *G02C 11/02* (2013.01); *G02C 3/003* (2013.01); *G02C 1/023* (2013.01)
USPC ............... 351/118; 351/41; 351/52; 351/110; 351/111; 351/123; D16/309

(58) Field of Classification Search
CPC ............ G02C 11/02; G02C 1/04; G02C 1/10; G02C 2200/10

USPC ............. 351/123, 113, 114, 111, 41, 158, 44, 351/118, 110, 52; D16/309
See application file for complete search history.

(56) References Cited

U.S. PATENT DOCUMENTS

| | | | | |
|---|---|---|---|---|
| 714,664 | A | * | 12/1902 | Briggs ........................... 351/124 |
| 3,495,898 | A | * | 2/1970 | Del Vecchio .................... 351/41 |
| 3,701,591 | A | * | 10/1972 | Wichers .......................... 351/41 |
| D229,974 | S | * | 1/1974 | Wicher et al. ................. D16/311 |
| 3,944,344 | A | * | 3/1976 | Wichers .......................... 351/41 |
| 4,152,051 | A | * | 5/1979 | Van Tiem et al. ............... 351/59 |
| 4,240,718 | A | * | 12/1980 | Wichers .......................... 351/62 |

(Continued)

FOREIGN PATENT DOCUMENTS

EP    0863424 B1    9/1998
GB    2 204 143     * 11/1988

OTHER PUBLICATIONS

Cathy, "Headband Eyewear for Those Not Worried About Hat Hair," <http://theopticalvisionsite.com/opti-fun/headband-eyewear-for-those-not-worried-about-hat-hair/>, Source: Gizmodo, dated Feb. 10, 2010, printed Jun. 3, 2011, 1 page.

*Primary Examiner* — Hung Dang
(74) *Attorney, Agent, or Firm* — Abel Law Group, LLP

(57) ABSTRACT

An eyewear frame has a forehead bridge that rests and is supported on a forehead of a user. A lens is mounted to the frame and both the lens and the frame are free of contact with a nose of the user. A pair of temples extends continuously from the forehead bridge and rest on and is supported by sides of a head of the user above ears of the user without touching the ears of the user.

20 Claims, 27 Drawing Sheets

(56) References Cited

U.S. PATENT DOCUMENTS

| | | | |
|---|---|---|---|
| 4,616,367 A * | 10/1986 | Jean et al. | 2/452 |
| 4,885,808 A * | 12/1989 | Carpenter | 2/452 |
| D325,590 S * | 4/1992 | Galy | D16/311 |
| 5,315,328 A | 5/1994 | Hofmair et al. | |
| 5,398,377 A | 3/1995 | Takiyama | |
| 5,426,473 A | 6/1995 | Riehm | |
| 5,570,492 A | 11/1996 | Nakanishi | |
| 5,579,062 A | 11/1996 | Sondrol | |
| 5,596,789 A | 1/1997 | Simioni | |
| 5,606,743 A | 2/1997 | Vogt et al. | |
| 5,631,719 A | 5/1997 | Chao | |
| 5,642,178 A | 6/1997 | Leonardi et al. | |
| 5,684,559 A | 11/1997 | Lin | |
| 5,729,321 A * | 3/1998 | Wielhouwer | 351/44 |
| 5,732,444 A | 3/1998 | Horikawa et al. | |
| 5,739,891 A | 4/1998 | Wei | |
| 5,739,892 A | 4/1998 | Kobayashi | |
| 5,745,952 A | 5/1998 | Baragar et al. | |
| 5,764,330 A | 6/1998 | Simioni | |
| 5,791,015 A | 8/1998 | Wandinger | |
| 5,818,566 A | 10/1998 | Carlon et al. | |
| 5,818,567 A | 10/1998 | Sakai | |
| 5,818,568 A | 10/1998 | Onaga et al. | |
| 5,844,655 A | 12/1998 | Chang | |
| 5,847,801 A | 12/1998 | Masunaga | |
| 5,894,336 A | 4/1999 | Baldissarutti | |
| 5,898,471 A | 4/1999 | Simioni et al. | |
| 5,903,332 A | 5/1999 | Devercelli | |
| 5,963,296 A | 10/1999 | Matera | |
| 5,971,539 A | 10/1999 | Kobayashi | |
| 5,980,039 A | 11/1999 | Schmid et al. | |
| 5,984,472 A | 11/1999 | Kobayashi | |
| 6,050,685 A | 4/2000 | Lin | |
| 6,050,686 A | 4/2000 | De Rossi | |
| 6,089,709 A * | 7/2000 | Fairclough | 351/103 |
| 6,099,120 A | 8/2000 | De Lima | |
| D431,042 S * | 9/2000 | Lin | D16/304 |
| 6,139,143 A | 10/2000 | Brune et al. | |
| 6,210,004 B1 | 4/2001 | Horikawa et al. | |
| 6,217,170 B1 | 4/2001 | Hsiao | |
| 6,254,235 B1 | 7/2001 | Hsieh Yeh | |
| 6,260,965 B1 | 7/2001 | Kroman et al. | |
| 6,302,539 B1 | 10/2001 | Tsai | |
| 6,357,874 B1 | 3/2002 | Miyazawa | |
| 6,412,944 B1 | 7/2002 | Huang et al. | |
| 6,481,053 B2 | 11/2002 | Desbiez-Piat | |
| 6,494,574 B2 | 12/2002 | Ebata | |
| 6,540,351 B1 | 4/2003 | Meiler | |
| 6,575,570 B2 | 6/2003 | Mauri | |
| 6,585,372 B1 | 7/2003 | Nagayoshi | |
| 6,752,496 B2 * | 6/2004 | Conner | 351/63 |
| 6,755,523 B1 | 6/2004 | Wiedner | |
| 6,779,887 B2 | 8/2004 | Meiler | |
| 6,786,594 B1 | 9/2004 | Lucas et al. | |
| 6,935,740 B1 | 8/2005 | Chang | |
| 6,948,811 B2 | 9/2005 | Kroman | |
| 7,011,406 B1 * | 3/2006 | Kim | 351/123 |
| 7,029,115 B2 | 4/2006 | Toulch | |
| 7,080,904 B2 | 7/2006 | Jobin et al. | |
| 7,090,347 B1 | 8/2006 | Rotman | |
| 7,101,039 B2 | 9/2006 | Maling | |
| 7,175,276 B1 | 2/2007 | Hsiung | |
| 7,237,892 B2 | 7/2007 | Curci et al. | |
| 7,344,242 B2 | 3/2008 | Habermann | |
| 7,410,253 B2 | 8/2008 | Habermann | |
| 7,422,322 B2 | 9/2008 | He | |
| 7,441,890 B2 | 10/2008 | Chung | |
| 7,472,990 B2 | 1/2009 | Chen | |
| 7,484,844 B2 | 2/2009 | Spandl | |
| 7,497,571 B2 | 3/2009 | Rossin | |
| 7,513,617 B1 | 4/2009 | Alford | |
| 7,540,608 B2 | 6/2009 | Carlon | |
| 7,543,931 B2 | 6/2009 | Proksch | |
| 7,553,013 B2 | 6/2009 | Tsai | |
| D598,041 S | 8/2009 | Corcagnani | |
| 7,604,347 B2 | 10/2009 | Gottschling et al. | |
| 7,621,633 B1 | 11/2009 | Foster | |
| 7,637,609 B1 | 12/2009 | Ifergan | |
| 7,645,040 B2 | 1/2010 | Habermann | |
| 7,695,133 B2 | 4/2010 | Bondet | |
| 7,703,913 B2 | 4/2010 | Huang | |
| 7,703,914 B2 | 4/2010 | Maling | |
| 7,712,894 B2 | 5/2010 | Tsai | |
| 7,712,896 B1 | 5/2010 | Lee | |
| 7,744,212 B2 | 6/2010 | Panisset | |
| 7,794,080 B2 | 9/2010 | Zelazowski | |
| 7,815,306 B2 | 10/2010 | Xiao | |
| 7,900,281 B2 | 3/2011 | Wozniak | |
| 7,997,722 B2 | 8/2011 | Gottscling et al. | |
| 8,020,988 B2 | 9/2011 | Ogren et al. | |
| 8,029,133 B2 | 10/2011 | Chen | |
| 8,038,291 B2 | 10/2011 | Chen | |
| 8,042,939 B2 | 10/2011 | Le Duy | |
| 8,083,345 B2 | 12/2011 | Chen | |
| 8,087,775 B2 | 1/2012 | Dollay | |
| 8,142,012 B2 | 3/2012 | Radmard et al. | |
| 8,177,360 B2 | 5/2012 | Sierra et al. | |
| 8,192,017 B2 | 6/2012 | Chen | |
| 8,256,894 B2 | 9/2012 | Ifergan | |
| 8,282,208 B2 | 10/2012 | Li | |
| 8,292,425 B2 | 10/2012 | Takeshi | |
| 8,353,593 B2 | 1/2013 | Senatore et al. | |
| 8,371,692 B2 | 2/2013 | LaGace et al. | |
| 8,414,120 B2 | 4/2013 | Cheong | |
| 2003/0020867 A1 | 1/2003 | Dei Negri et al. | |
| 2004/0207806 A1 | 10/2004 | Kerjean | |
| 2005/0225717 A1 | 10/2005 | Reane | |
| 2005/0243271 A1 | 11/2005 | Oura et al. | |
| 2005/0251960 A1 | 11/2005 | Kanou et al. | |
| 2008/0013040 A1 | 1/2008 | Anderl | |
| 2008/0266517 A1 | 10/2008 | Reane | |
| 2009/0225271 A1 | 9/2009 | Radmard et al. | |
| 2010/0097565 A1 | 4/2010 | Ifergan | |
| 2011/0304814 A1 | 12/2011 | Wong | |
| 2012/0026452 A1 | 2/2012 | Delamour et al. | |
| 2012/0236253 A1 | 9/2012 | Altemare, Jr. et al. | |
| 2012/0307197 A1 | 12/2012 | Haffmans et al. | |
| 2012/0307198 A1 | 12/2012 | Ifergan | |
| 2012/0327360 A1 | 12/2012 | Lin | |
| 2013/0003012 A1 | 1/2013 | Tsai | |
| 2013/0033675 A1 | 2/2013 | Cheong | |
| 2013/0044288 A1 | 2/2013 | Cheng | |
| 2013/0201438 A1 | 8/2013 | Gasparetto | |

* cited by examiner

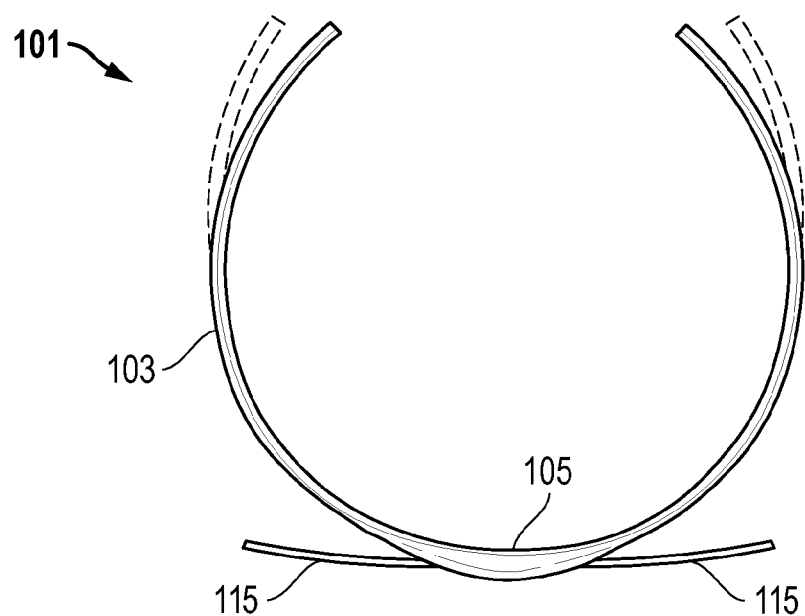
FIG. 8
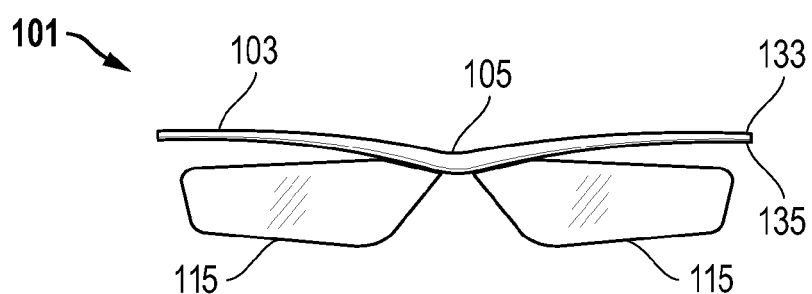
FIG. 9
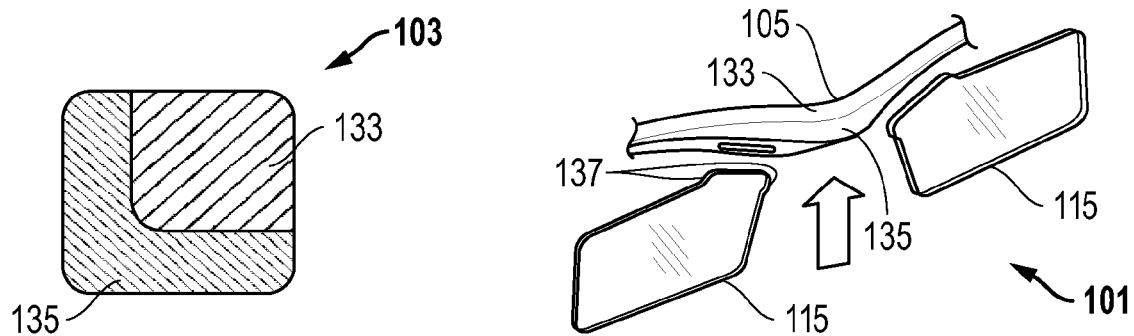
FIG. 10
FIG. 11

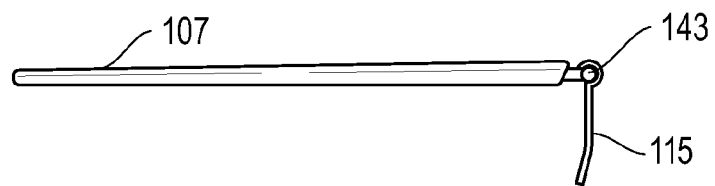
FIG. 14
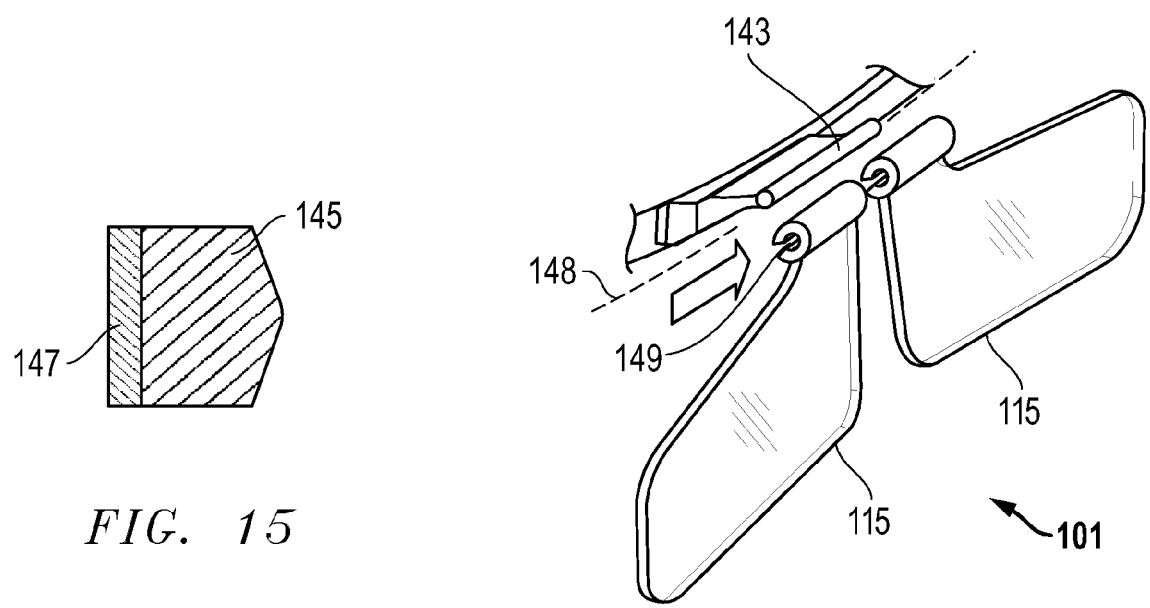
FIG. 15
FIG. 16

INNOVATIVE AND AESTHETIC ALTERNATIVE TO TRADITIONAL SPECTACLE CORRECTION

CROSS-REFERENCE TO RELATED APPLICATION

The present application claims priority from U.S. Provisional Patent Application No. 61,360,314, filed Jun. 30, 2010, entitled "INNOVATIVE AND AESTHETIC ALTERNATIVE TO TRADITIONAL SPECTACLE CORRECTION THAT OBVIATES THE NOSE/NASAL BRIDGE AND EARS FOR PLACEMENT," naming inventor Jaclyn L. Jirsa, which application is incorporated by reference herein in its entirety.

FIELD OF THE DISCLOSURE

The present invention relates to an innovative and aesthetic eyewear alternative to traditional spectacle correction that obviates the nose/nasal bridge and ears for placement and support of the eyewear.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIGS. 7-11 are isometric, top, front, sectional and exploded isometric views of another embodiment of eyewear;

FIGS. 12-16 are front, top, side, sectional and exploded views of another embodiment of eyewear;

The use of the same reference symbols in different drawings indicates similar or identical items.

DETAILED DESCRIPTION

Figure 1:
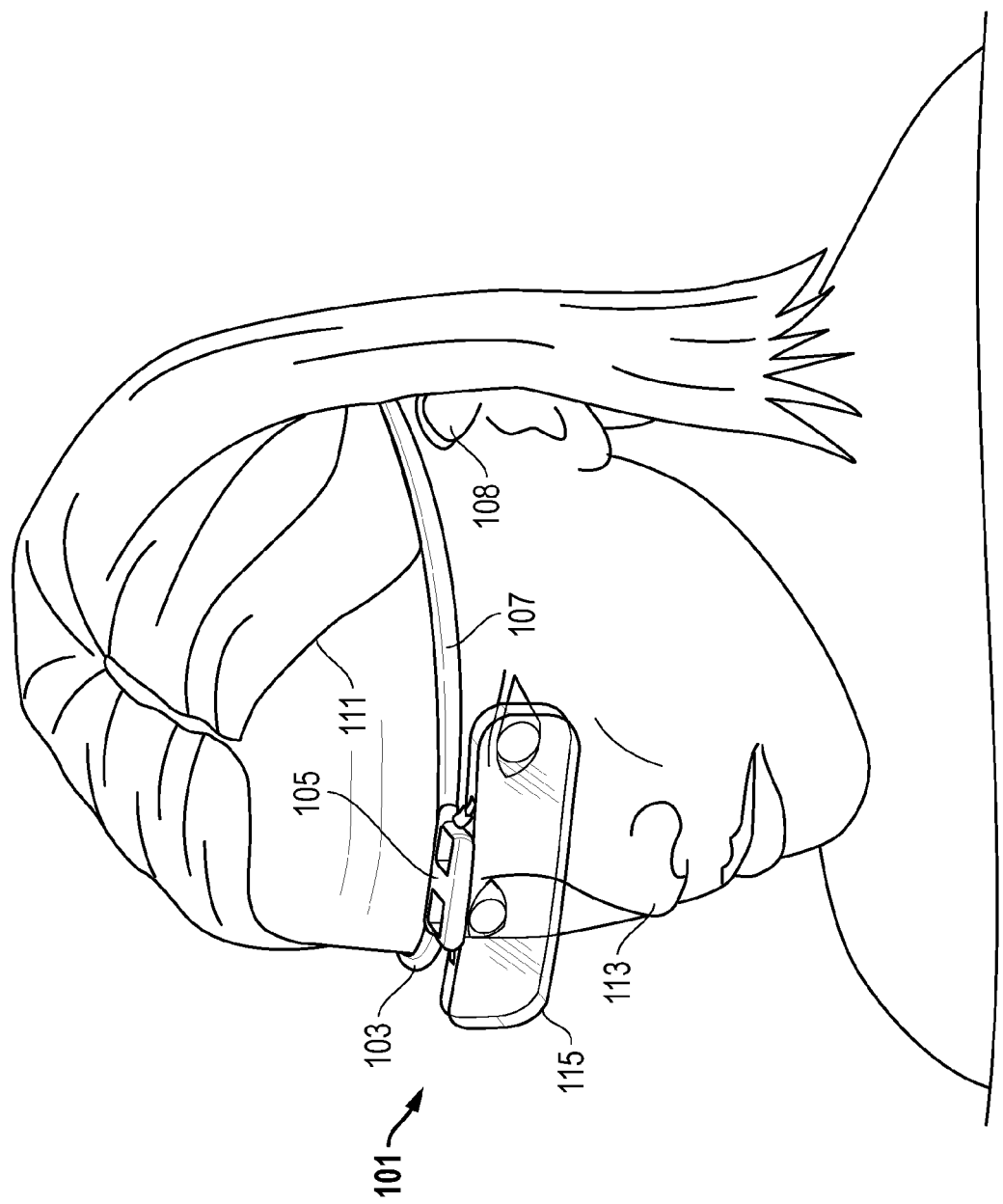
FIGS. 1 and 2 are isometrics views of embodiments of eyewear.

Embodiments of a system, method and apparatus for eyewear are disclosed. For example, FIG. 1 depicts eyewear 101 comprising a frame 103 having a forehead bridge 105 and a pair of temples 107 extending from the forehead bridge 105. The forehead bridge 105 is adapted to rest and be supported on a forehead 109 of a user. In some embodiments, the forehead bridge 105 is located at or above the eyebrows of the user, but below the hairline 111 of the user. All portions of the frame 103 are free of contact with and do not touch the nose 113 of the user.

Figure 2:
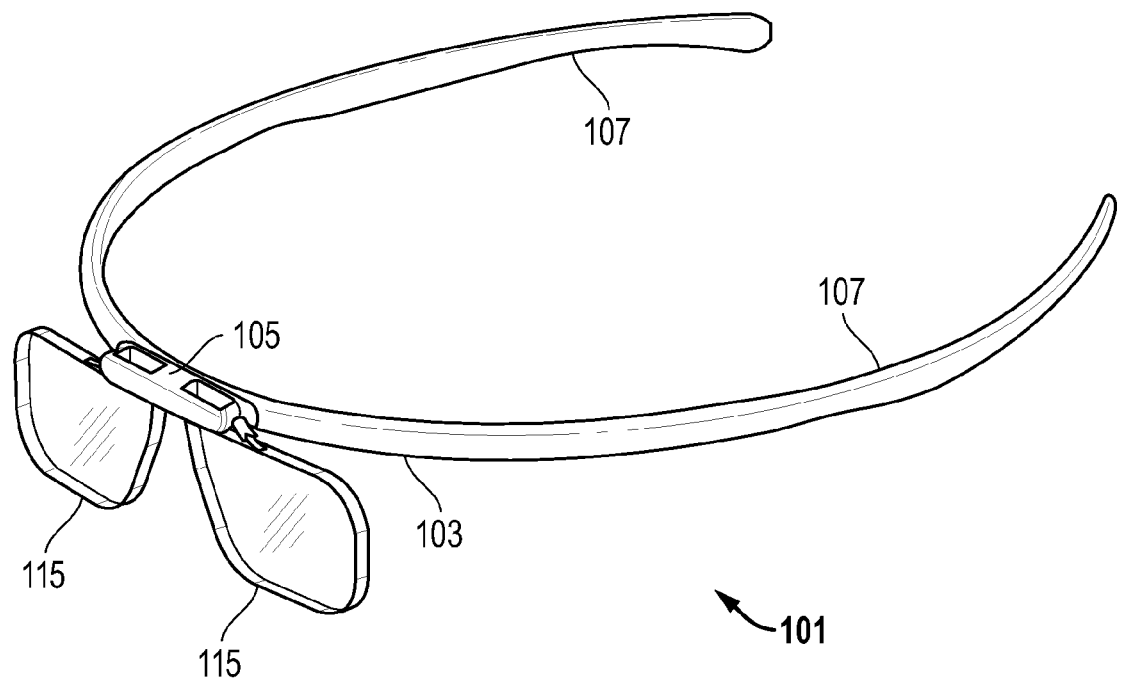
Figure 3:
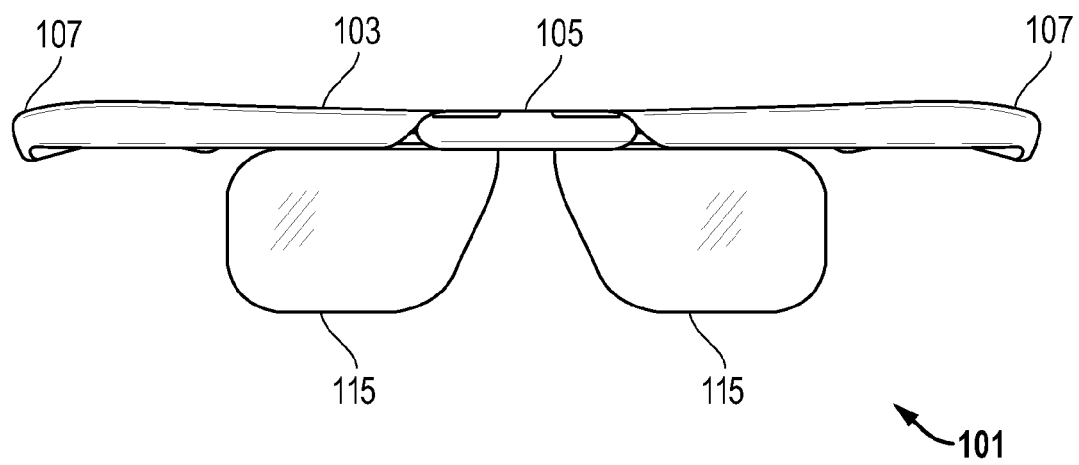
FIG. 3 is a front view of the embodiment of eyewear of FIG. 2.

In addition, a lens 115 is mounted to the forehead bridge 105 and extends therefrom, such that the lens 115 is also free of contact with the nose 113 of the user. The frame 103 and the lens 115 have no nose bridge or nose pieces. The lens 115 may comprise a single lens (FIG. 1) having a horizontal width sufficient to provide binocular vision for the user. Alternatively, the lens may comprise two lenses 115 (FIGS. 2 and 3), each of which is independently mounted to the forehead bridge 105.

In some versions, the temples 107 may extend continuously from the forehead bridge 105 and be adapted to rest on and be supported by sides of a head of the user above ears 108 of the user without touching the ears 108 of the user. In some embodiments, the frame 103 is a monolithic, unitary structure without hinges between the forehead bridge 105 and temples 107. The frame 103 may be circular, oval or elliptical in shape in some designs. In addition, the frame 103 may have an inner surface that is formed at a uniform radius.

Figure 4:
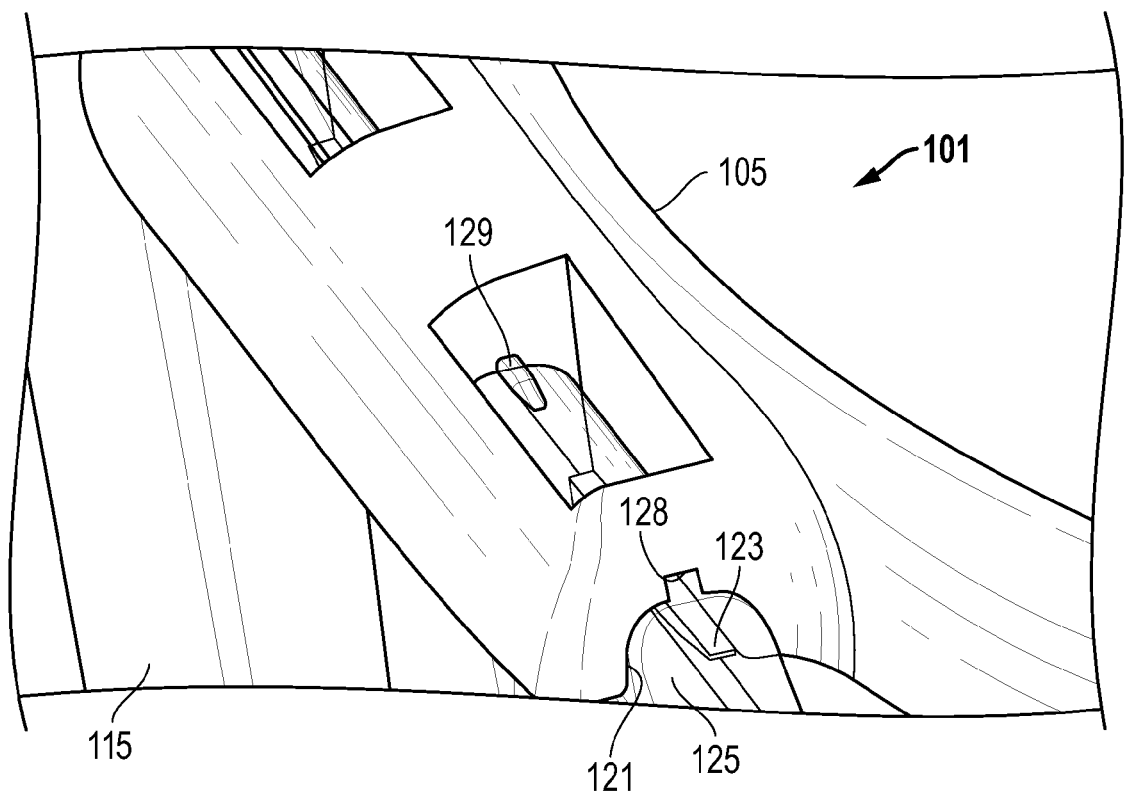
FIGS. 4 and 5 are enlarged isometric and side views of an interface between frame and lens of an embodiment of eyewear.
Figure 5:
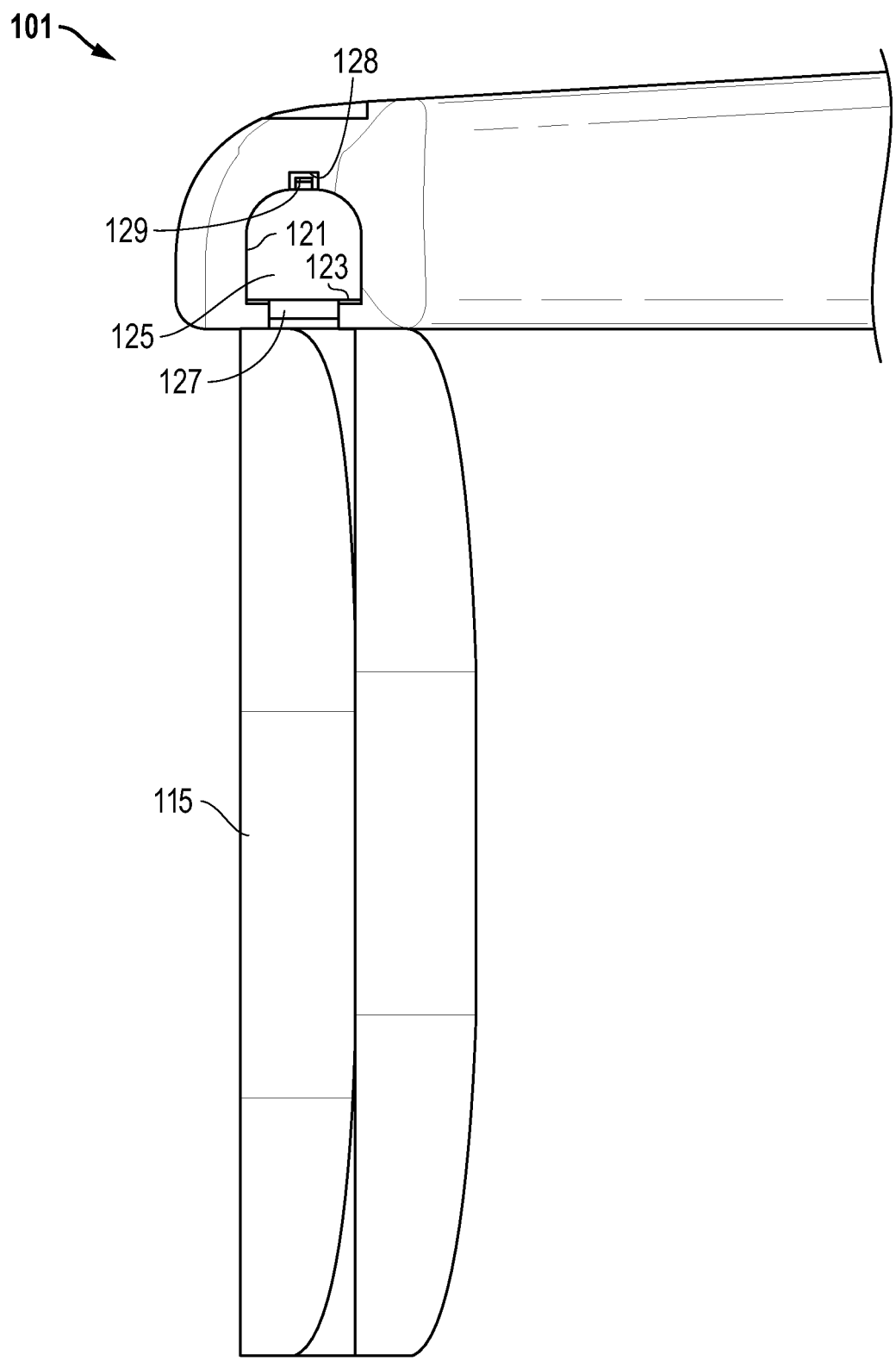
Figure 6:
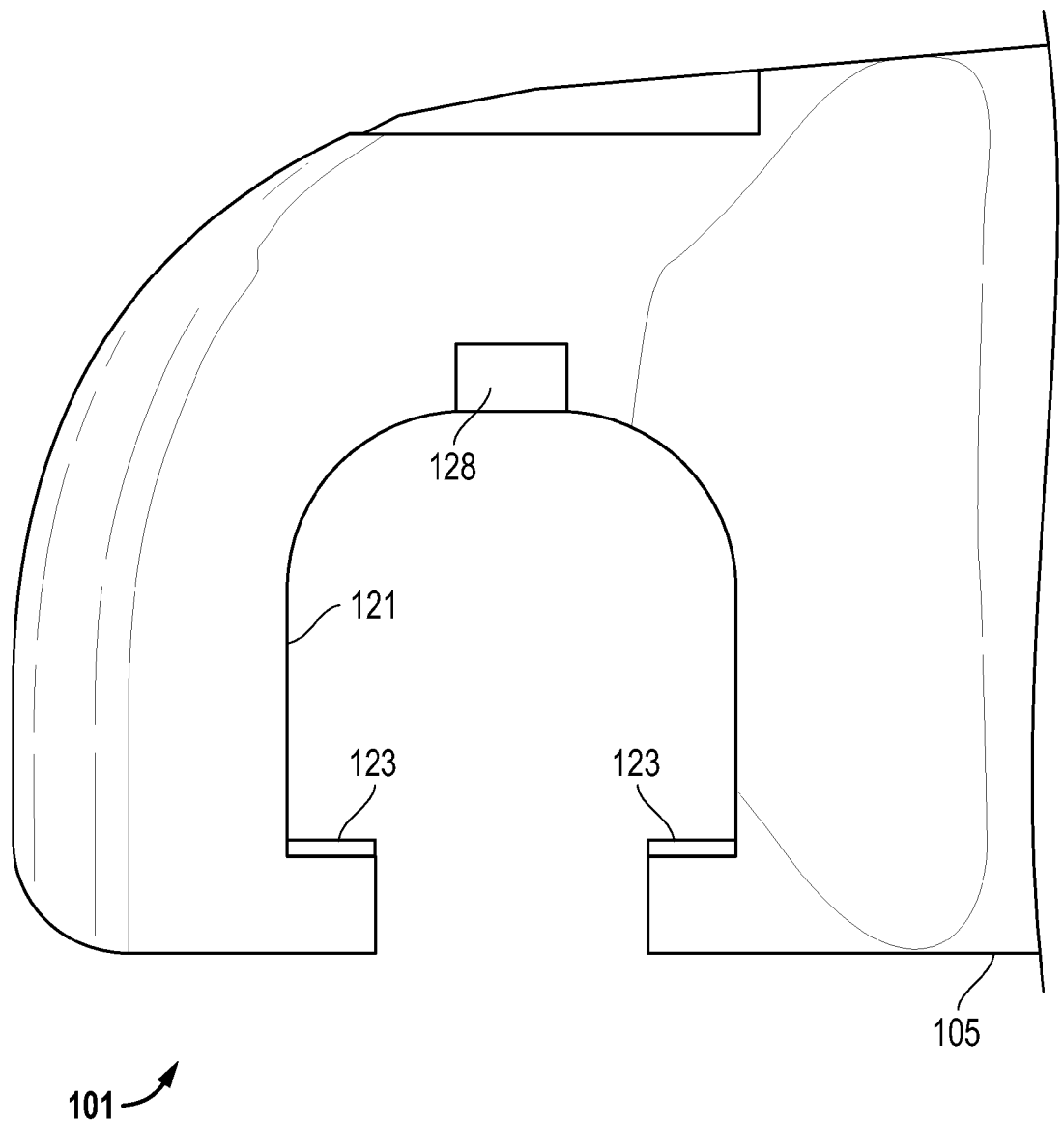
FIG. 6 is a further enlarged side view of the interface between frame and lens of an embodiment of eyewear.
Figure 7:
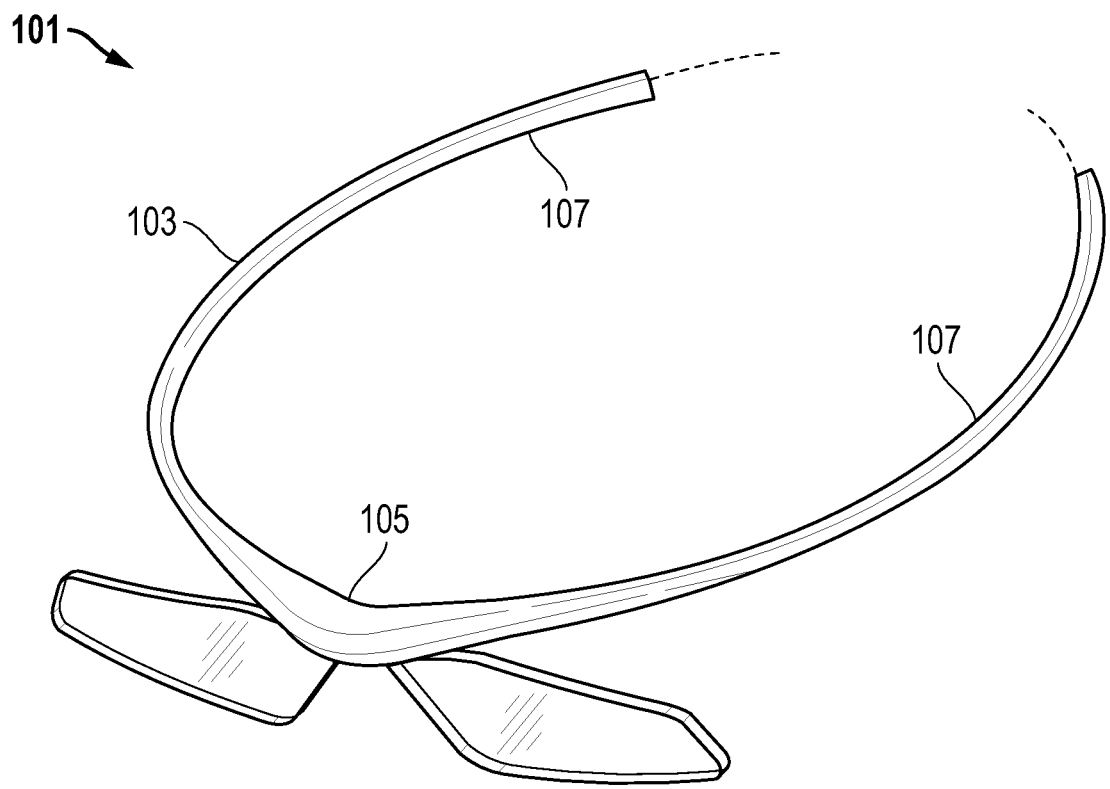

As shown in FIGS. 4-6, the forehead bridge 105 may be provided with a channel 121 having a groove 123. The lens 115 may have a protrusion 125 that is complementary in shape to the channel 121 and a tongue 127 that slidingly engages the groove 123 to align and retain the lens 115 on the forehead bridge 105. The lens 115 also may have a stop or interference 129 (FIGS. 4 and 5) to prevent the lens 115 from being pushed too far into the frame 103. A notch 128 may be provided in frame 103 to allow interference 129 to pass through channel 121.

In another embodiment (FIGS. 7-11), the frame 103 is formed along a curved axis 131 that bends toward the lens at the forehead bridge 105. The forehead bridge 105 is greater in radial dimension than the temples 107, as shown. The temples 107 are flexible (i.e., they can bend inward or outward) to adjust a diameter of the frame 103. The frame 103 has a rectangular sectional shape (FIG. 10) and is formed from an outer material 133 having a greater hardness than an inner material 135. The lens 115 may be configured to snap and lock into the inner material 135 at forehead bridge 105 with a mechanical joint 137.

Figure 12:
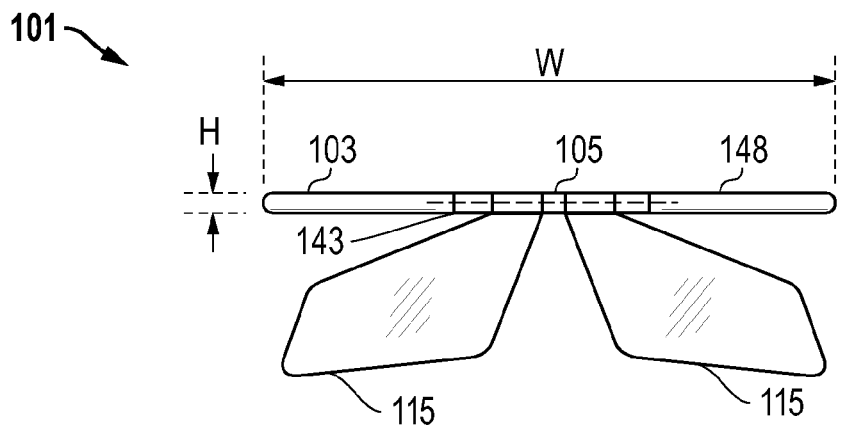
Figure 13:
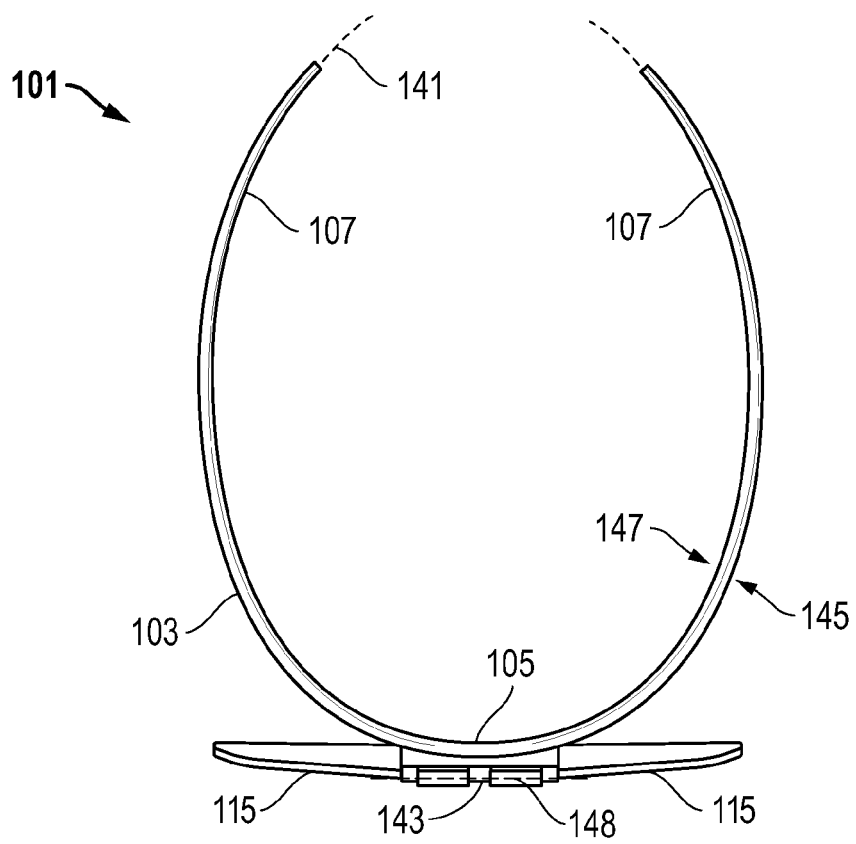

Referring now to FIGS. 12-16, another embodiment of eyewear 101 comprises a frame 103 that is formed along a curved axis 141 (FIG. 13) that is flat (FIGS. 12 and 14). The forehead bridge 105 may comprise a rod 143. The frame 103 may be formed from an outer material 145 having a greater hardness than an inner material 147, and both the inner and outer materials extend continuously along an entire length of the frame 103.

The lens 115 may comprise an elongated cylindrical aperture 149 (FIG. 16) that slidingly receives the rod 143 to mount the lens 115 to the forehead bridge 105. The lens may comprise two lenses 115 that are axially repositionable (see, e.g., FIGS. 12 and 16) along an axis 148 of the rod 143.

Another embodiment of eyewear 101 (FIGS. 17-19) may comprise a frame 103 that is formed along a curved axis 151 that is flat. The forehead bridge 105 may comprise a lens bracket 153 molded therein (FIG. 19) and extending therefrom, such that the lens 115 is mounted to the lens bracket 153. As best shown in FIG. 19, the frame 103 may be formed from an outer material 155 having a greater hardness than an inner material 157, and both the inner and outer materials 157, 155 extend continuously along an entire length of the frame 103.

Figure 17:
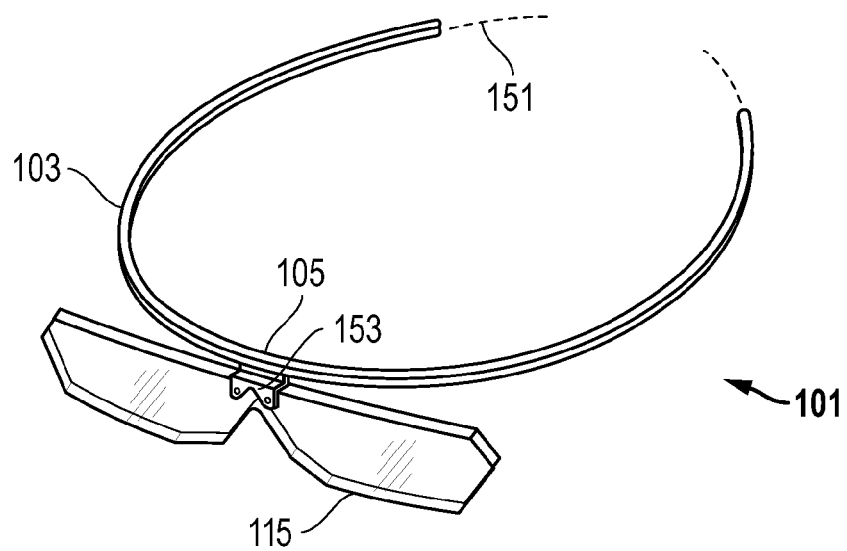
FIGS. 17-19 are isometric, exploded isometric, and sectional side views of another embodiment of eyewear.
Figure 18:
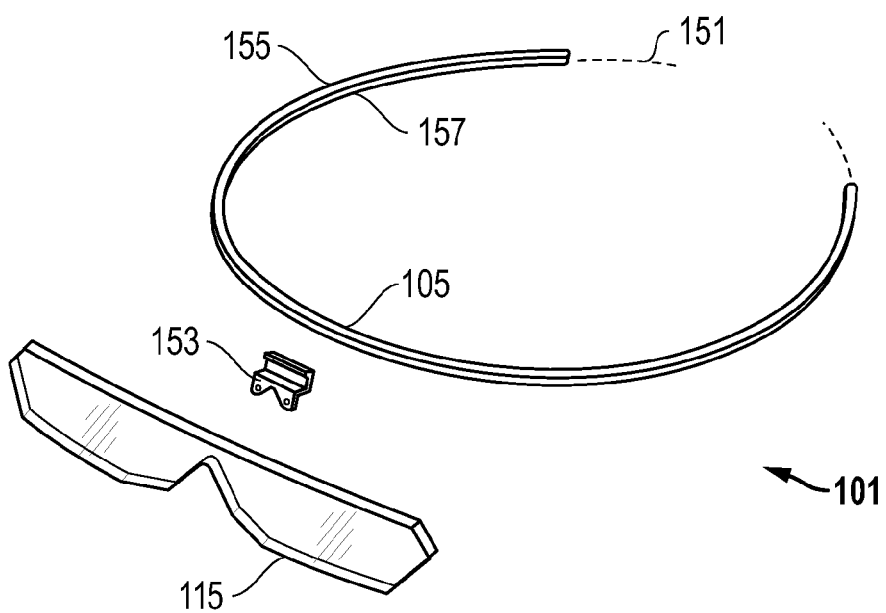
Figure 19:
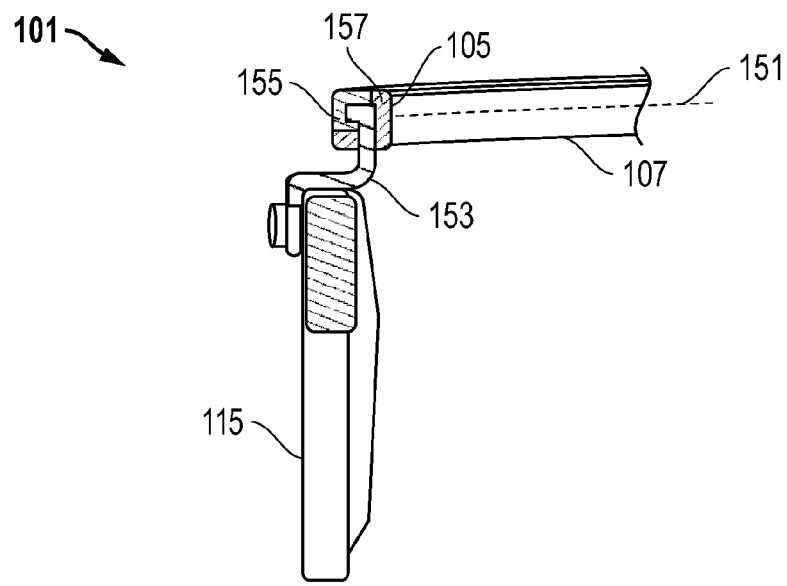
Figure 20:
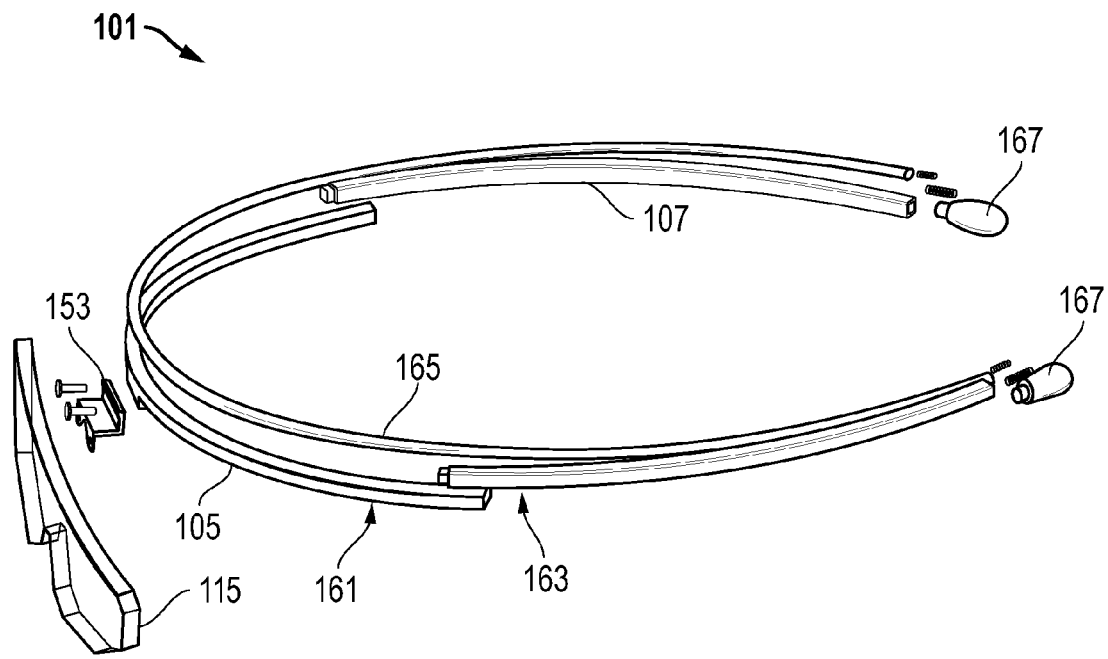
FIG. 20 is an exploded isometric view of another embodiment of eyewear.

FIG. 20 is an alternate version comprising components similar to those of the embodiment of FIGS. 17-19. However, in this embodiment, the forehead bridge 105 is formed a first material 161, the temples 107 are formed from a second material 163, and an elastic band 165 extends through the forehead bridge 105 and temples 107 to secure pads 167 on axial ends of the temples 107.

Figure 21:
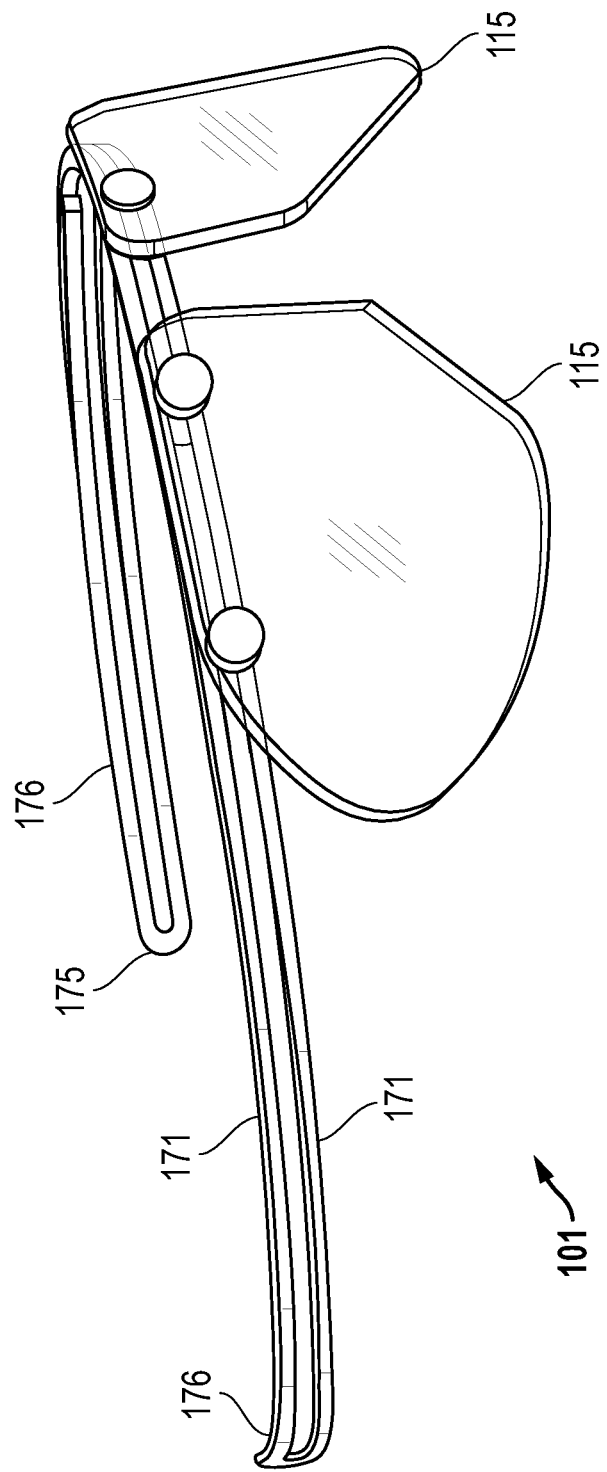
FIGS. 21-24 are isometric, front, top and sectional side views of another embodiment of eyewear.
Figure 22:
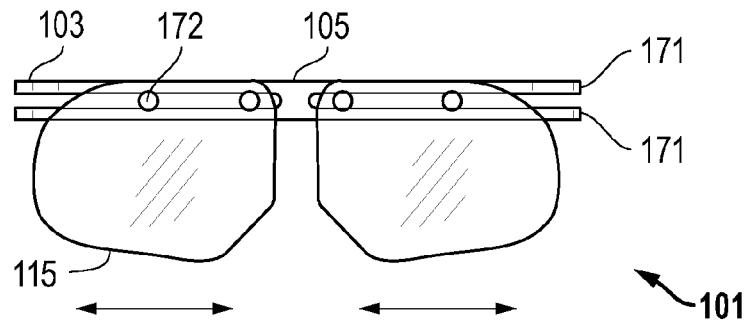
Figure 23:
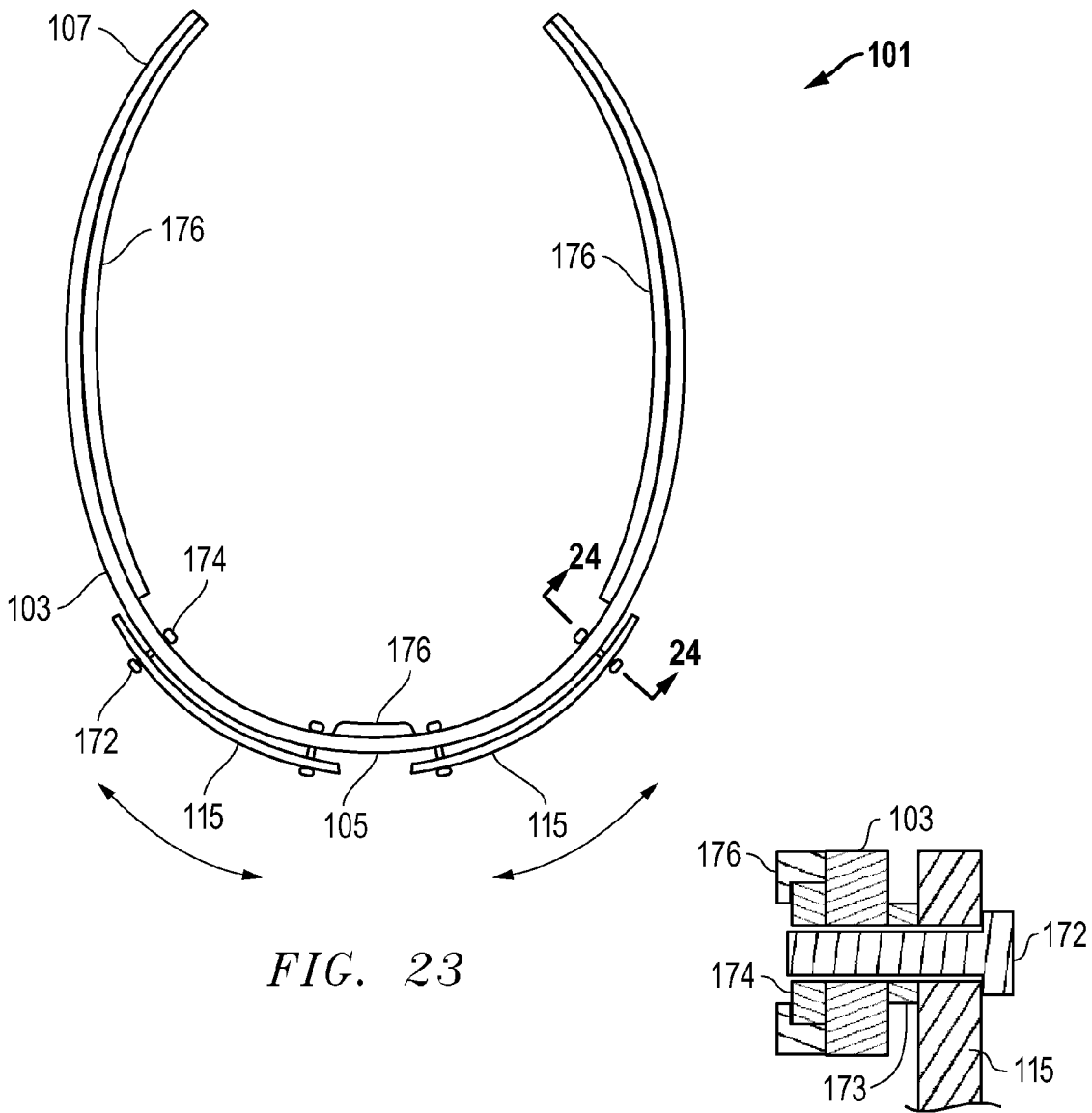
Figure 24:
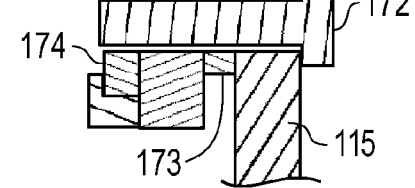
Figure 25:
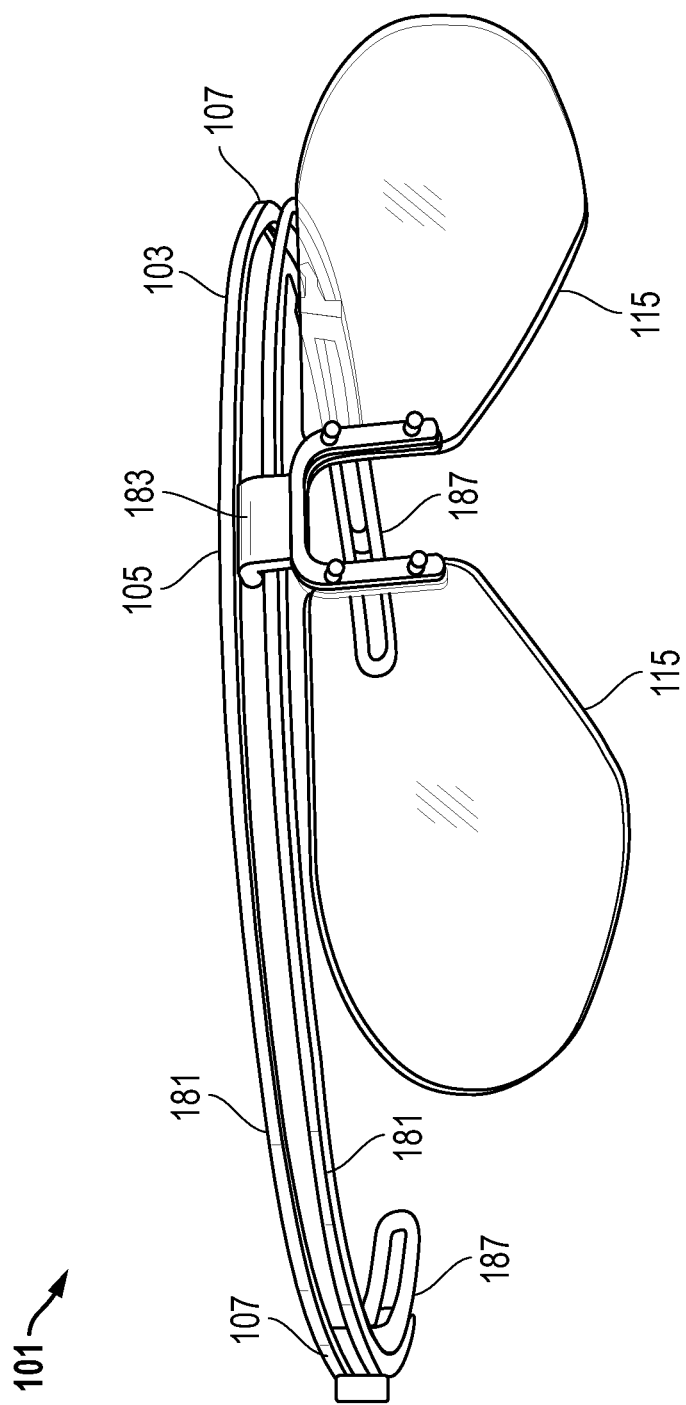
FIGS. 25-29 are isometric, front, top, exploded isometric and operational views of another embodiment of eyewear.
Figure 26:
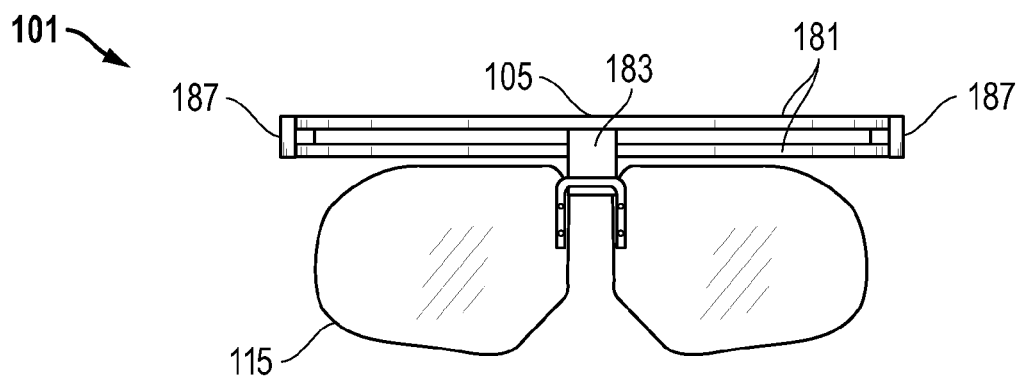
Figure 27:
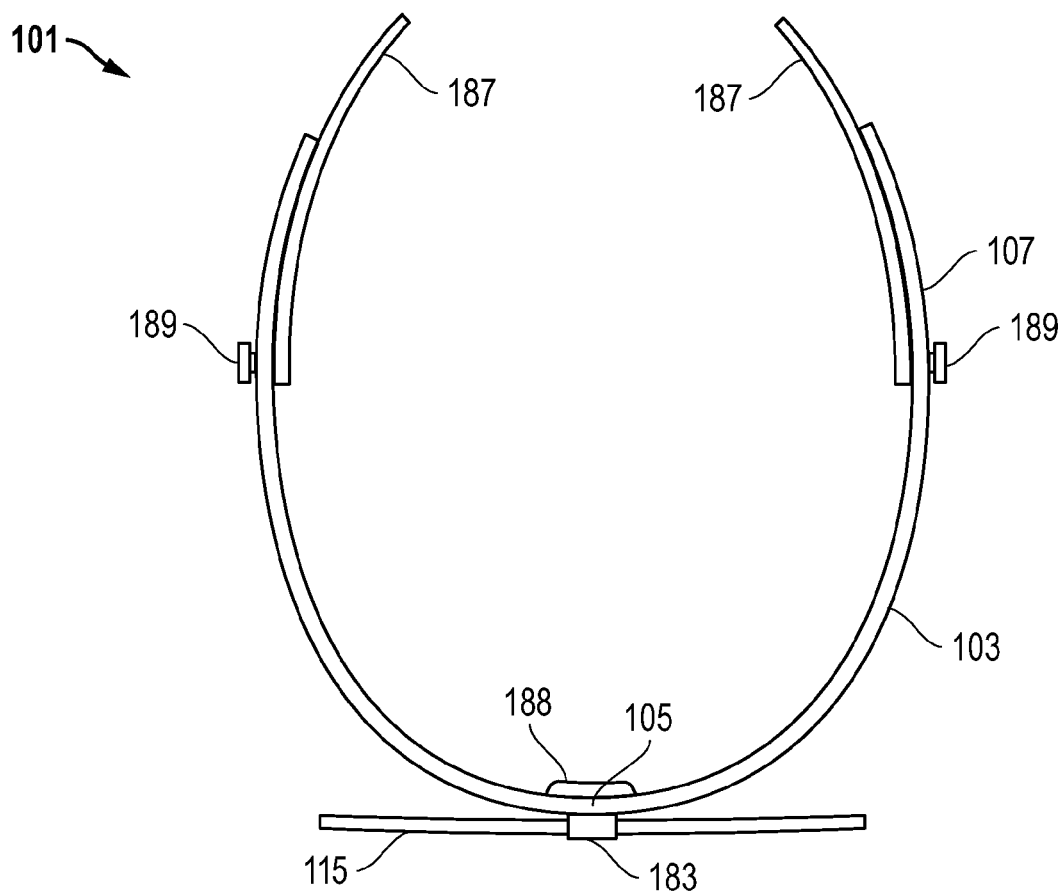
Figure 28:
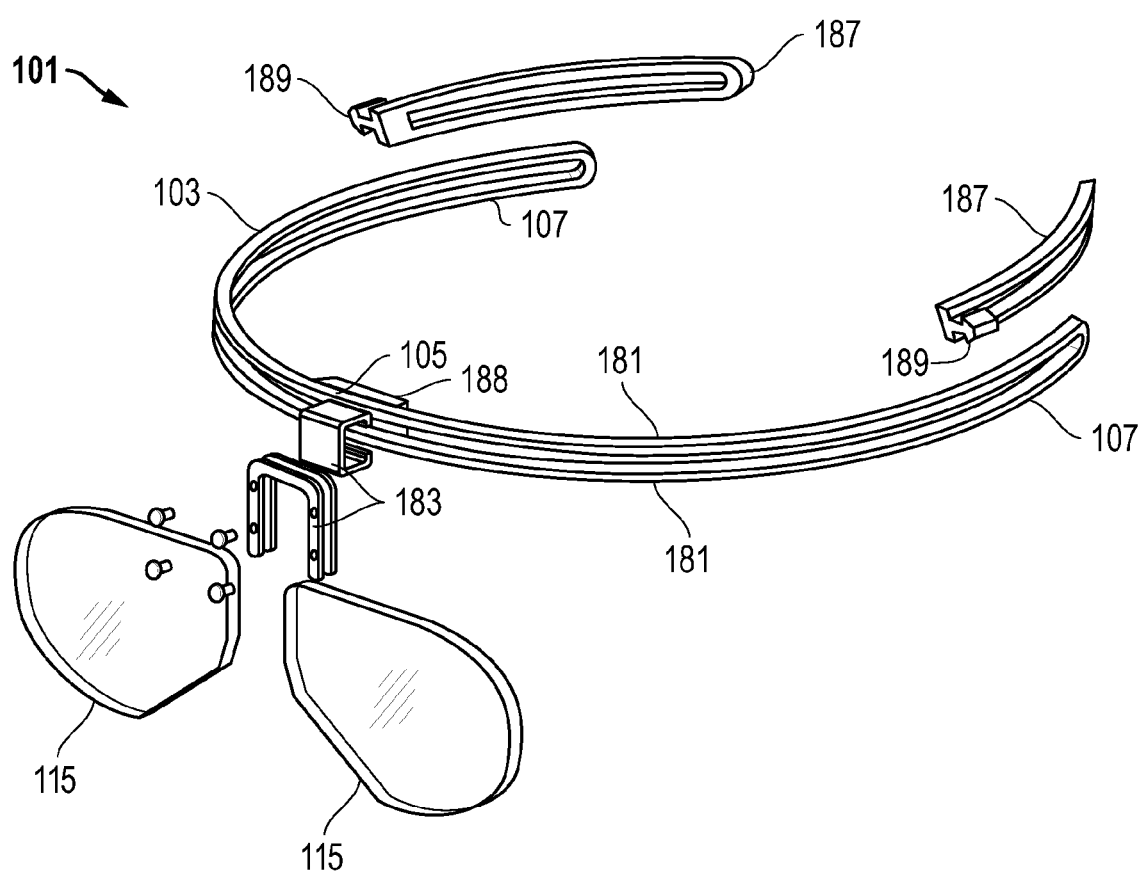
Figure 29:
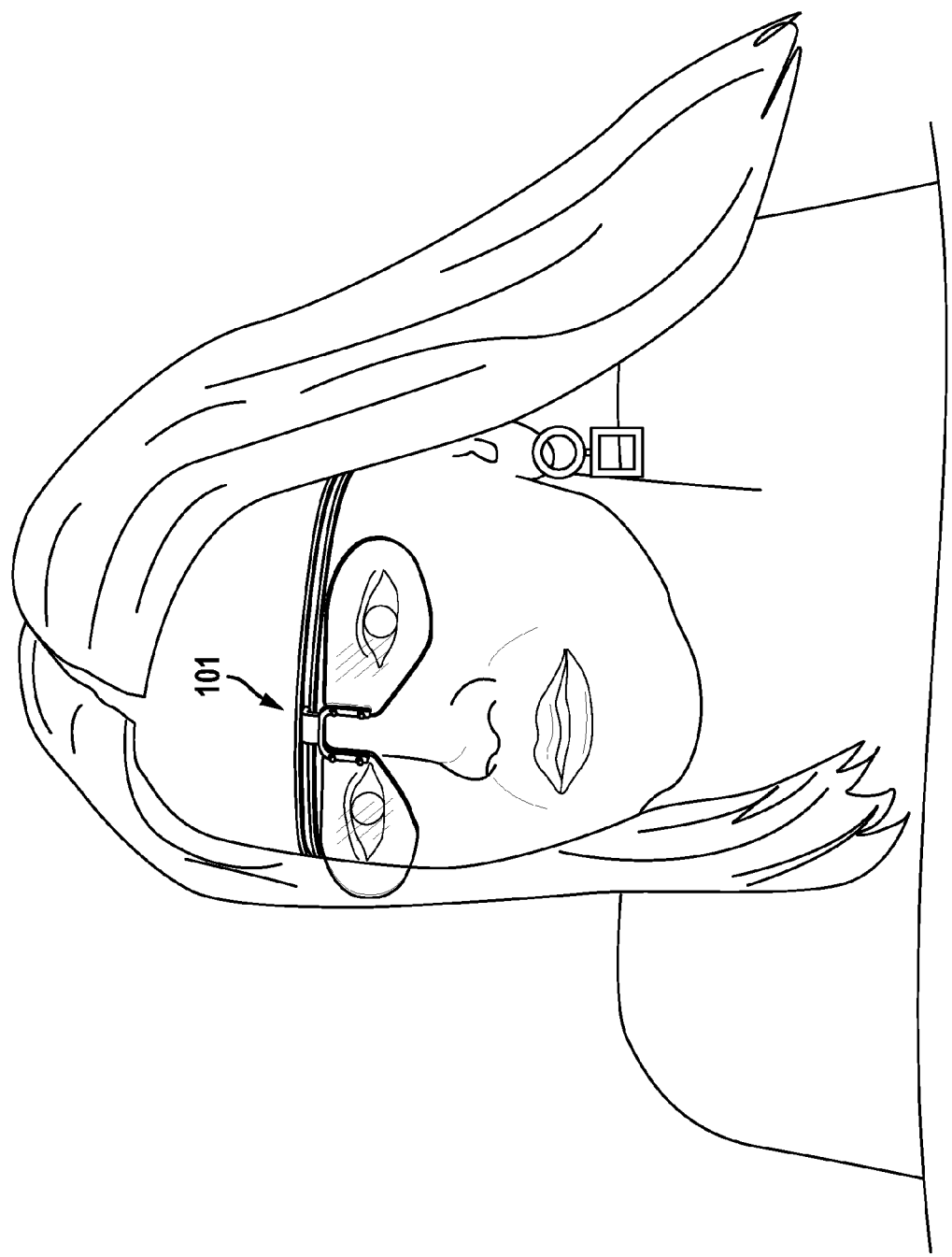
Figure 30:
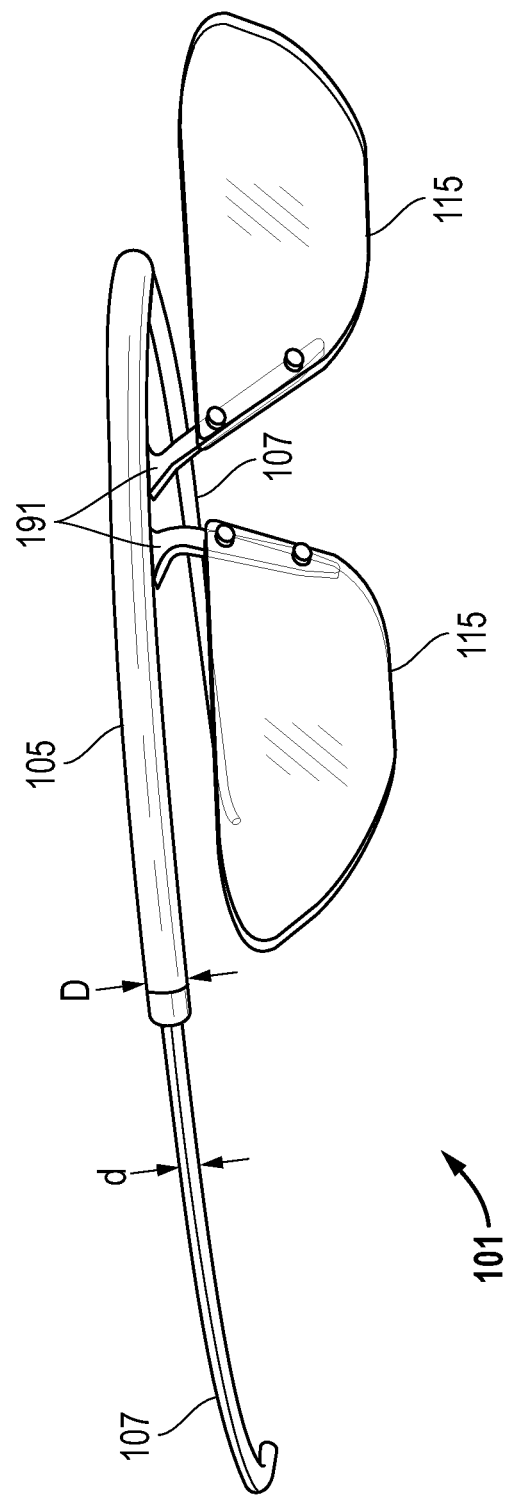
FIGS. 30-34 are isometric, front, top, bottom and exploded views of another embodiment of eyewear.
Figure 31:
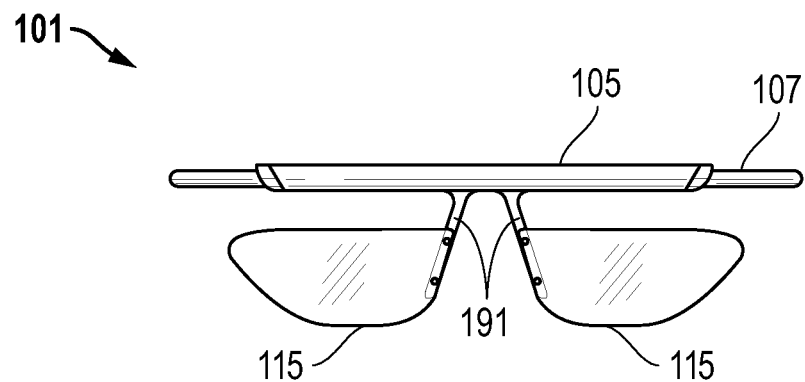
Figure 32:
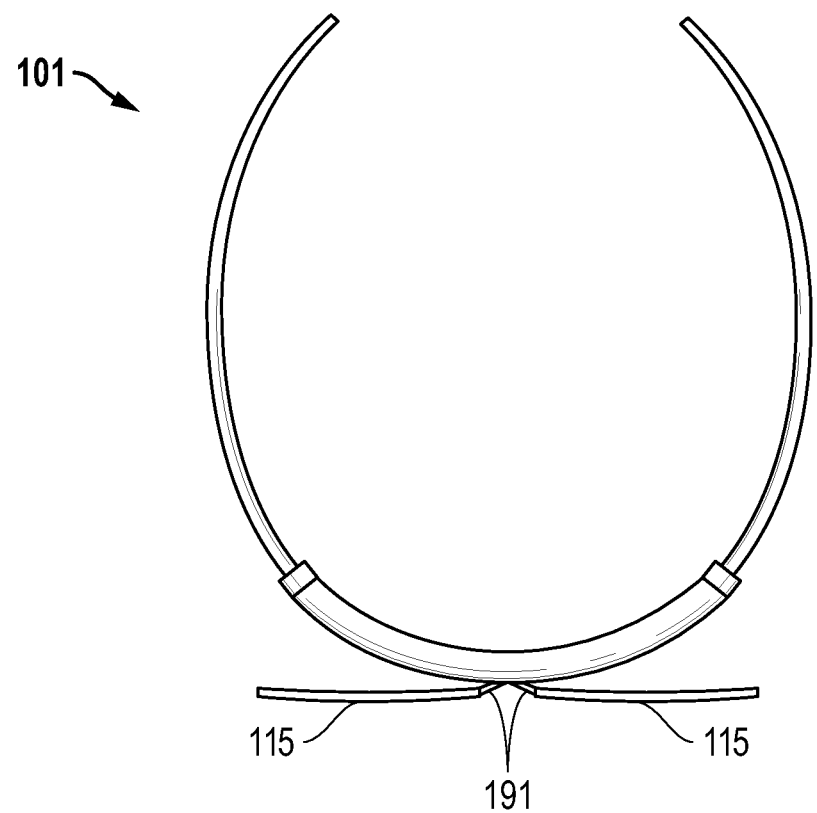
Figure 33:
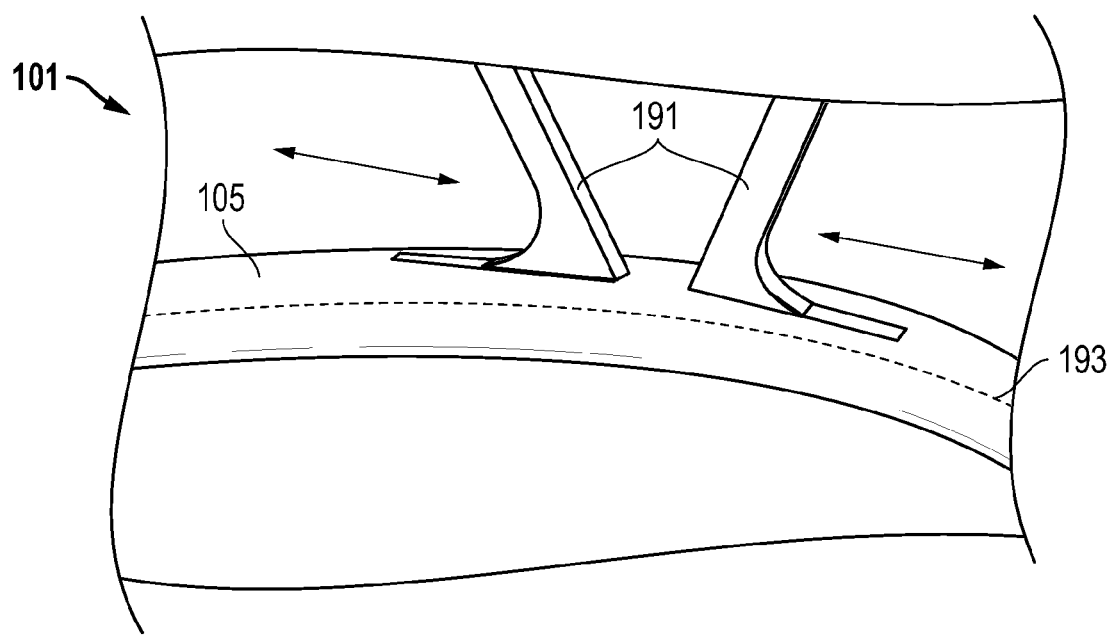
Figure 34:
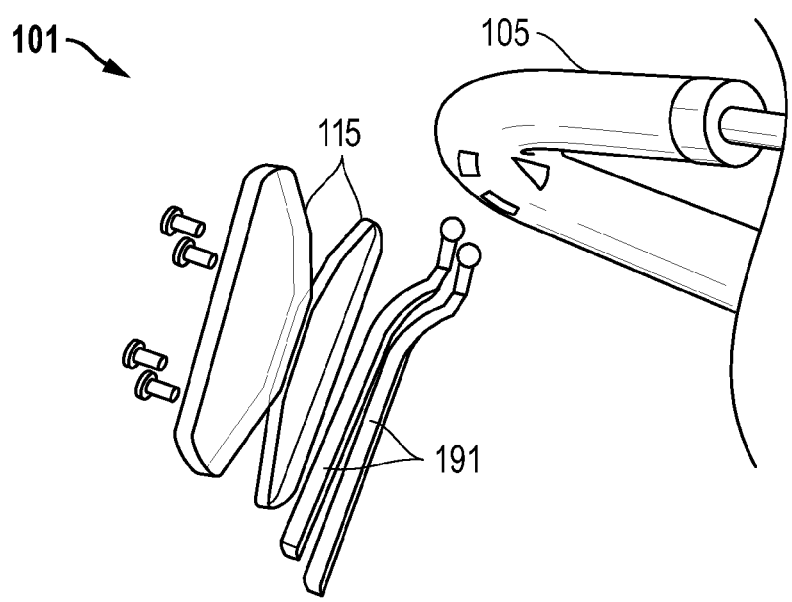

FIGS. 21-24 disclose yet another embodiment of eyewear 101 wherein the frame 103 comprises a pair of wires 171 that are circular and parallel. The lens 115 may be mounted directly to both wires 171. The lens may comprise a pair of lenses 115 that are adjustably movable (see, e.g., FIG. 22) around the pair of wires 171. The lens(es) 115 may be bolted to the frame 103 with fasteners 172 that extend between the pair of wires 171. As shown in FIG. 24, a washer 173 and nut 174 also may be employed. Each of the temples 107 may terminate by joining ends of the wires to form a circular tab 175 (FIG. 21).

The frame 103 may further comprise at least one pad 176 mounted to an inner surface of the frame 103. For example, the at least one pad comprise three pads 176 (best shown in FIG. 23) that are spaced apart from each other. Two of the pads 176 may be on the temples 107, and one pad 176 may be located opposite the lens 115. In this and other embodiments, the lens(es) 115 may have an outer perimeter that is completely exposed and unobstructed by any portion of the frame 103 or other hardware, including a lack of a nosepiece or nose pads.

In the embodiment of FIGS. 25-29, the frame 103 may comprises a pair of circular, parallel wires 181 with the lens 115 mounted to the forehead bridge 105 with a lens bracket 183 joined to and extending from both wires 181. In some versions, each of the wires 181 has a rectangular sectional shape. The lens bracket 183 may have an inverted U-shape and be provided in various different sizes.

Embodiments may further comprise an interior temple 185 mounted to each of said pair of temples 107, with the interior temples 185 being adjustable relative to said pair of temples to adjust a length of the frame 103. For example, the frame 103 may be formed from a metallic material and the interior temples 187 may be formed from a polymer that slidably engages and is resettably fixable to the pair of temples 107, respectively. A tab 189 on each interior temple 187 may extend between the wires 181 on each respective temple 107 to provide retention and/or adjustability. As described for other embodiments herein, an additional pad 188 may be provided on forehead bridge 105 opposite lens 115.

FIGS. 30-34 depict an embodiment of eyewear 101 having a forehead bridge 105 with a circular sectional shape and a first diameter D. The temples 107 also may have circular sectional shapes and a second diameter d that is smaller than the first diameter D. The forehead bridge 105 and the temples 107 may be coaxial. The lengths of the temples 107 may be axially movable and adjustable relative to the forehead bridge 105, as shown.

The lens may comprise two lenses 115, each of which is mounted to the forehead bridge 105 with a separate lens bracket 191 extending downward and outward from the forehead bridge 105. The lens brackets 191 may be adjustably movable relative to an axis of the forehead bridge.

Figure 35:
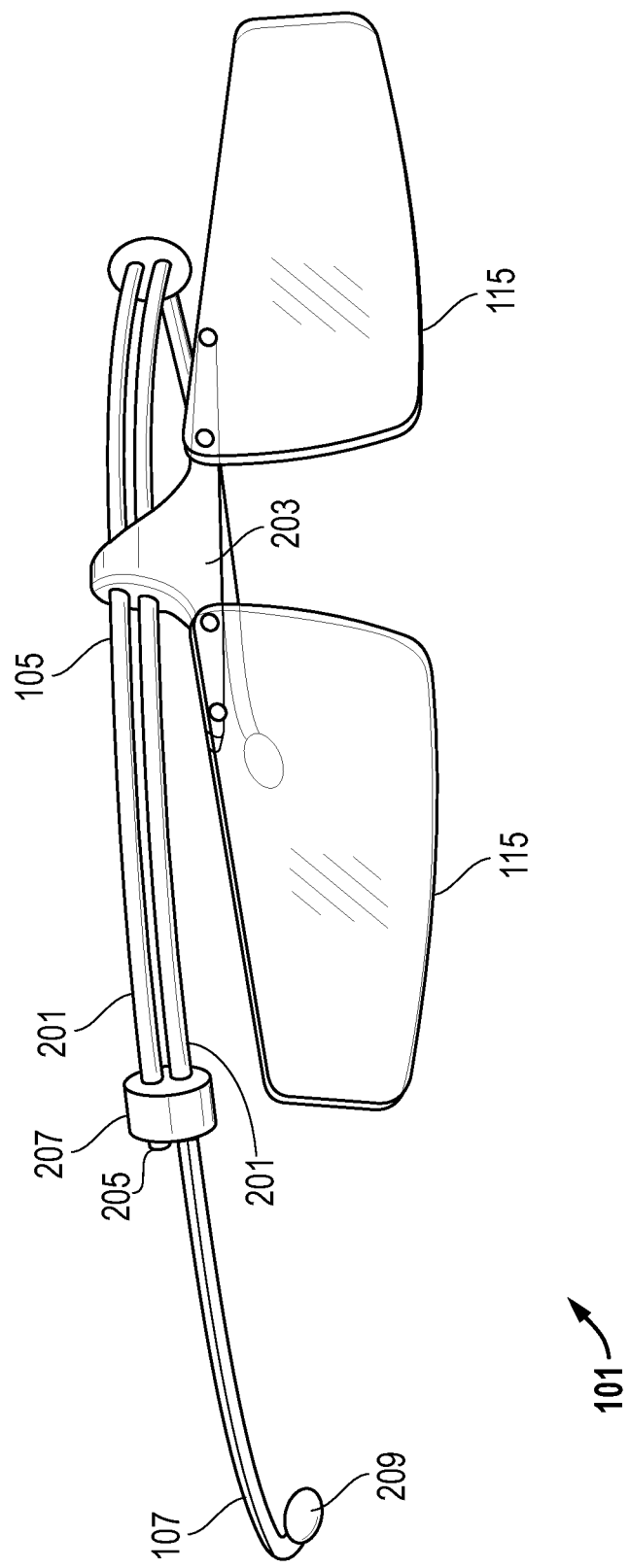
FIGS. 35-37 are isometric, front and exploded views of another embodiment of eyewear.
Figure 36:
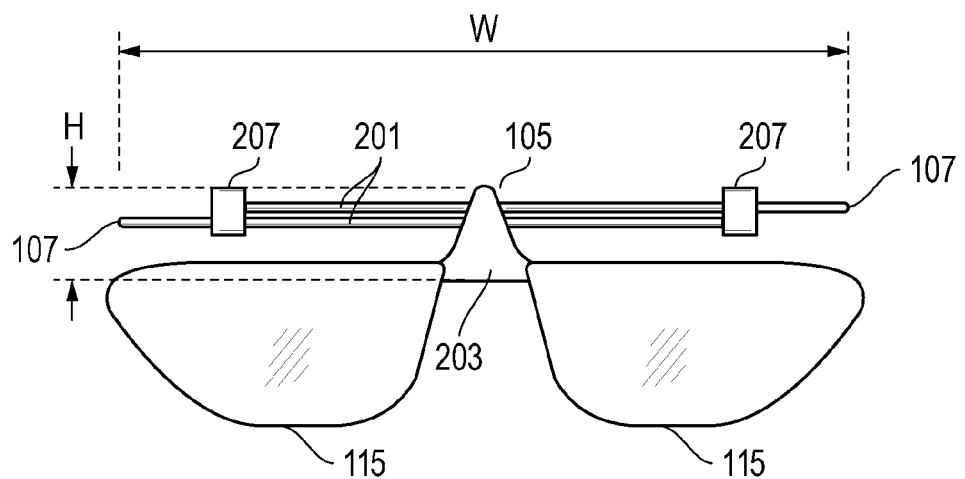
Figure 37:
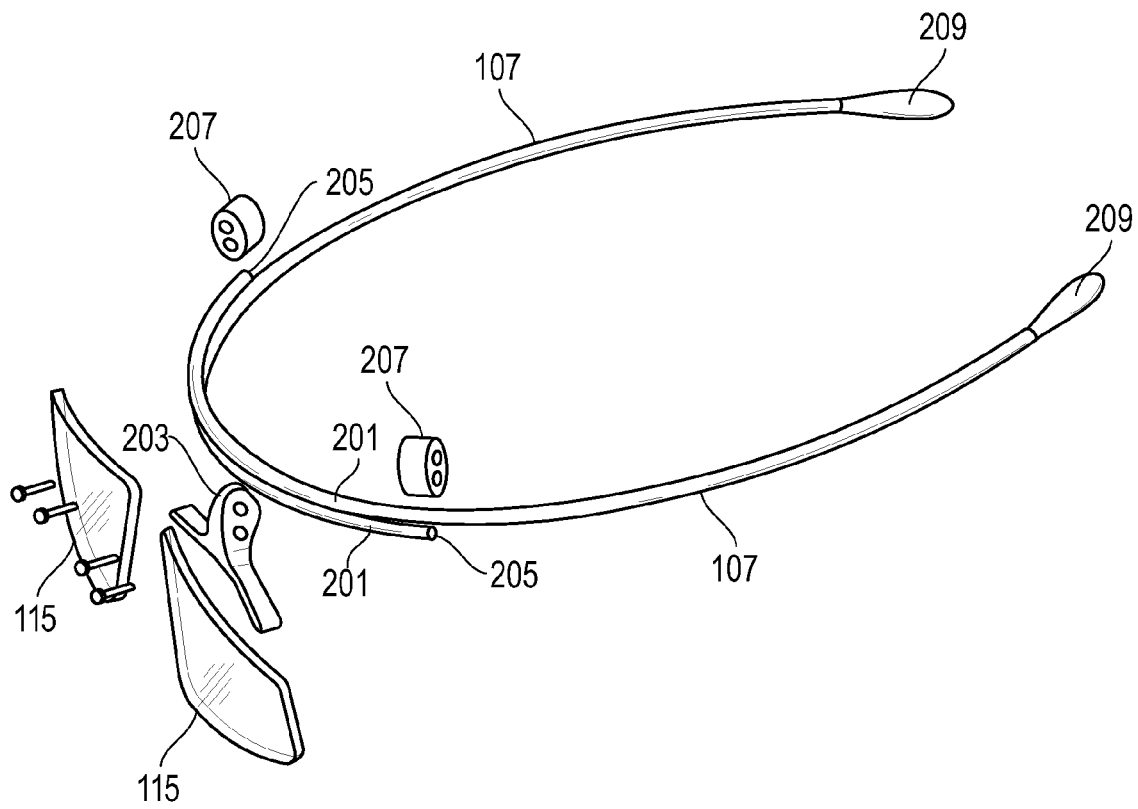

The embodiment of FIGS. 35-37 may comprise eyewear 101 having a frame 103 with a pair of semi-circular, parallel wires 201. The lens 115 may be mounted to the forehead bridge 105 with a lens bracket 203 joined to and extending from both wires 201. The lens bracket 203 may have an inverted T-shape.

A lower one of the wires 201 may extend continuously with one of the temples 107, and an upper one of the wires 201 may extend continuously with the other one of the temples 107. One axial end 205 of each of the wires 201 may be secured to the other one of the wires 201 with fasteners 207 to define the forehead bridge 105. Each of the wires 201 may have a circular sectional shape. The fasteners 207 may be cylindrical in shape, and may further comprise soft end tips 209 on the axial ends of the temples 107 to provide cushioning for the user.

Figure 38:
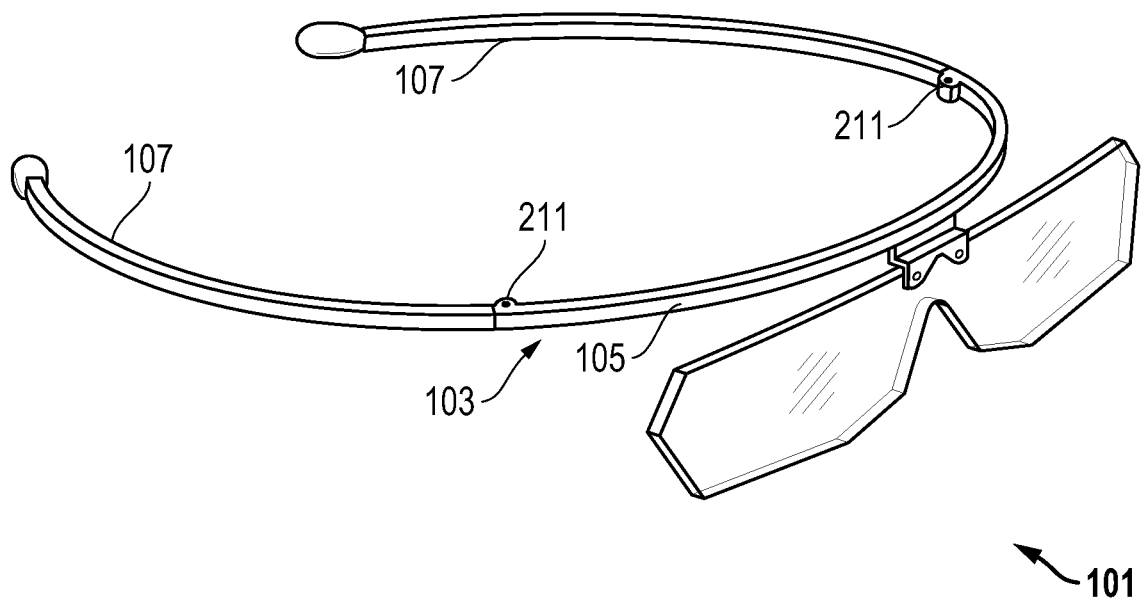
FIGS. 38-39 are isometric views of still another embodiment of eyewear.
Figure 39:
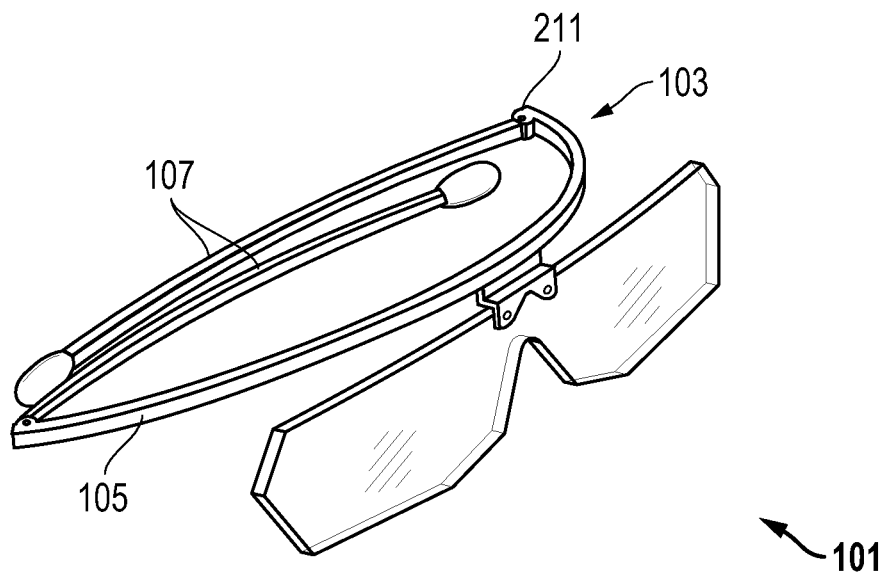

FIGS. 38 and 39 depict and embodiment that further comprises hinges 211 that are located between the forehead bridge 105 and each of the temples 107. The frame 103 may have an unfolded configuration (FIG. 38) wherein the forehead bridge 105 and temples 107 extend substantially along a same radius, and a folded configuration (FIG. 39) wherein the temples 107 extend toward opposite ones of the hinges 211.

In still other embodiments, the eyewear 101 may be defined in other manners. For example, as illustrated in FIGS. 12 and 36, the frame 103 may have an aspect ratio that is defined by a horizontal width W of the frame 103 with respect to a vertical height H of the frame 103. The aspect ratio may include all hardware and components used to mount the lens 115 to the forehead bridge 105. In some embodiments, the aspect ratio may be as small as about 4.4 (e.g., FIG. 36), and as large as about 17 (e.g., FIG. 12).

Referring now to FIGS. 40-46, embodiments of attachments for eyewear are shown. These attachments are well suited for displaying graphic or textual displays (e.g., brand identity, logos, advertisement, etc.) that may be formed in two or three dimensions.

Figure 40:
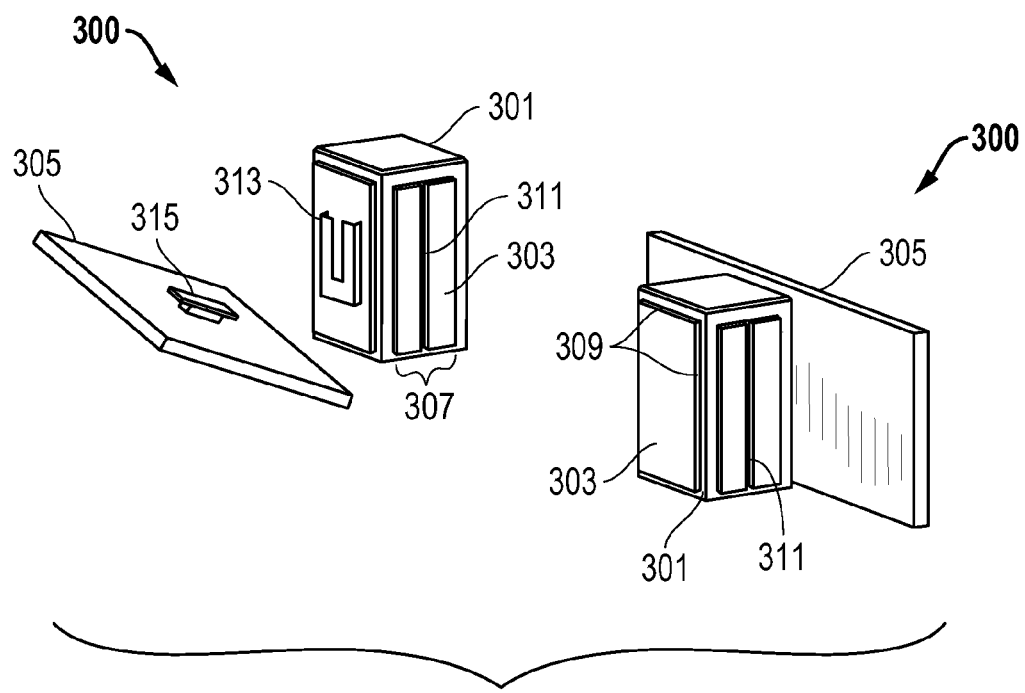
FIG. 40 depicts isometric views of an embodiment of an attachment for eyewear.
Figure 41:
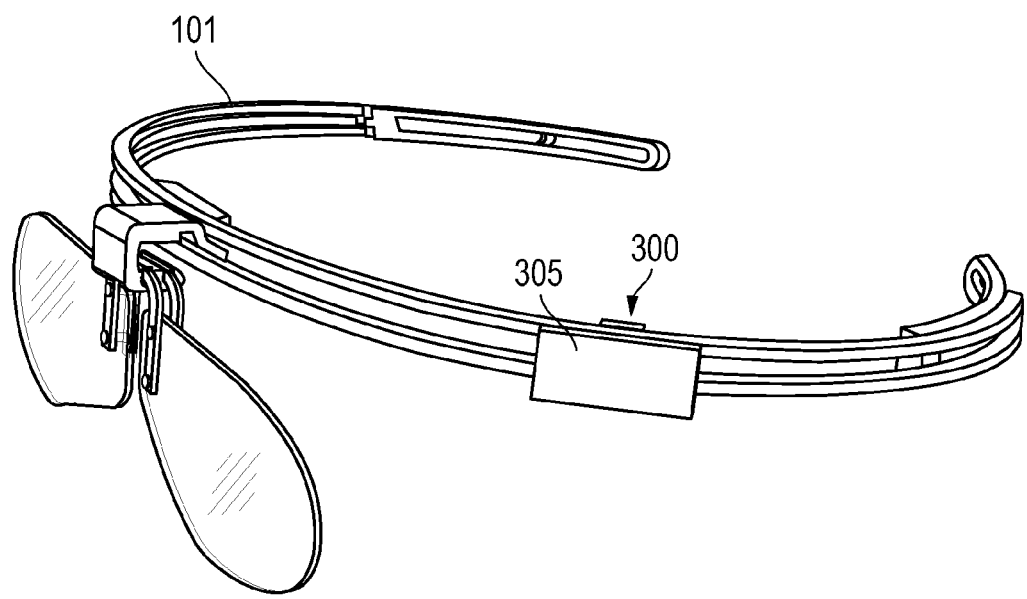
FIG. 41 is an isometric view of an embodiment of an attachment attached to eyewear in operation.

For example, FIG. 40 depicts isometric views of one type of attachment 300 for eyewear. Attachment 300 may comprise a robust frame 301, a soft insert 303 and a display 305. In the embodiment shown, the frame 301 has an open lower end in which insert 303 may be mounted. A rectangular window 309 may be formed on a back side of frame 301 opposite display 305 helps secure insert 303 within frame 301. The insert 303 is slightly larger than frame 301, and expands to fill the space within the frame, extending slightly through window 309. The insert 303 also has a vertical slot 311 formed therein for receiving and mounting to eyewear as is described elsewhere herein. The front side of frame 301 may be provided with a mounting structure 313 for securing display 305 thereto. As shown in FIG. 40, the mounting structure 313 may comprise a U-shaped projection and slit for slidingly receiving a protuberance 315 on a back side of display 305 (e.g., tongue and groove designs). Display 305 may be temporarily or permanently mounted to frame 301.

Figure 42:
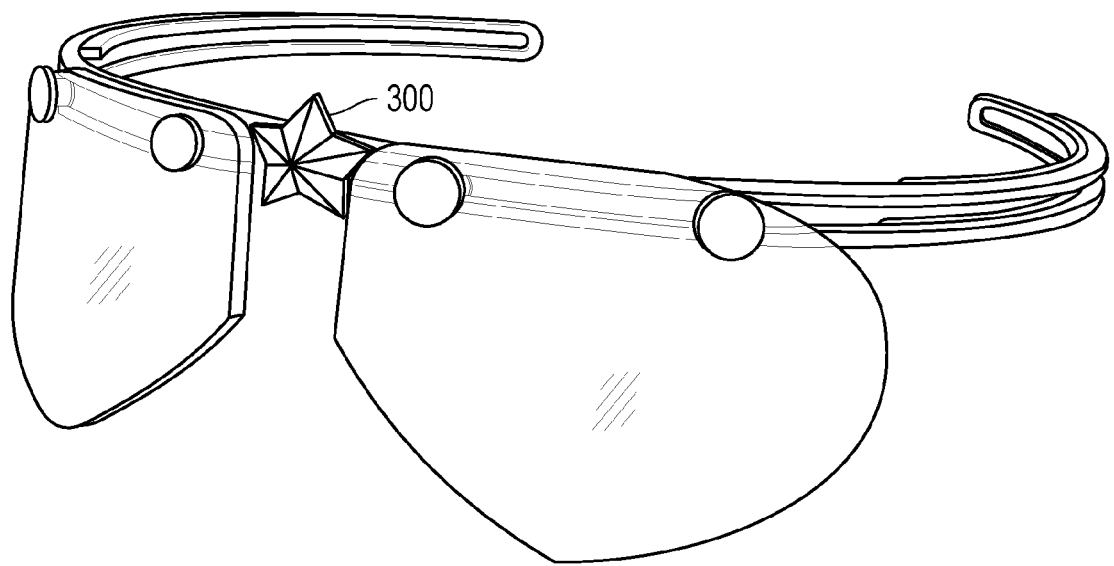
FIG. 42 is an isometric view of another embodiment of an attachment for eyewear.

In operation (FIG. 41), attachment 300 may be mounted to eyewear, such as any of the embodiments of eyewear 101 disclosed herein. For example, attachment 300 may be mounted to the frame of eyewear 101. The slot 311 of attachment 300 slides onto the frame element of eyewear 101 to resiliently secure and retain attachment 300 thereto. Attachment 300 may be temporarily or permanently secured to eyewear 101. As described previously, the front side of display 305 may illustrate or depict different types of images or objects. For example, FIG. 42 illustrates an alternate embodiment of attachment 300 at a different location on another style of eyewear.

Figure 43:
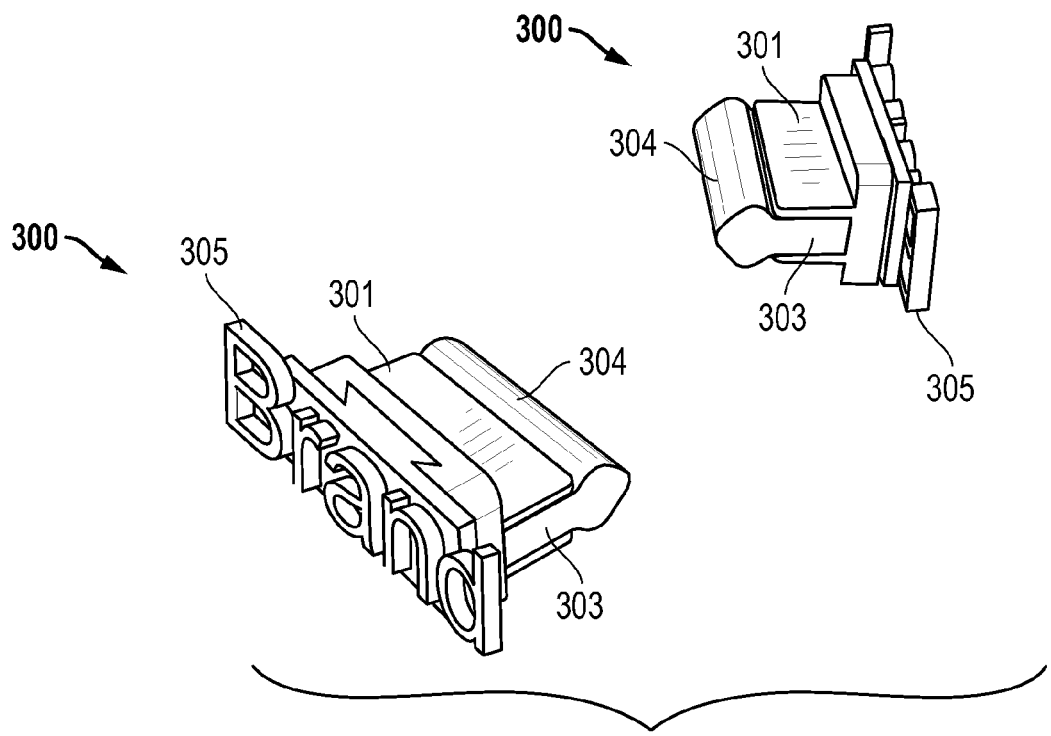
FIG. 43 depicts isometric views of still another embodiment of an attachment for eyewear.
Figure 44:
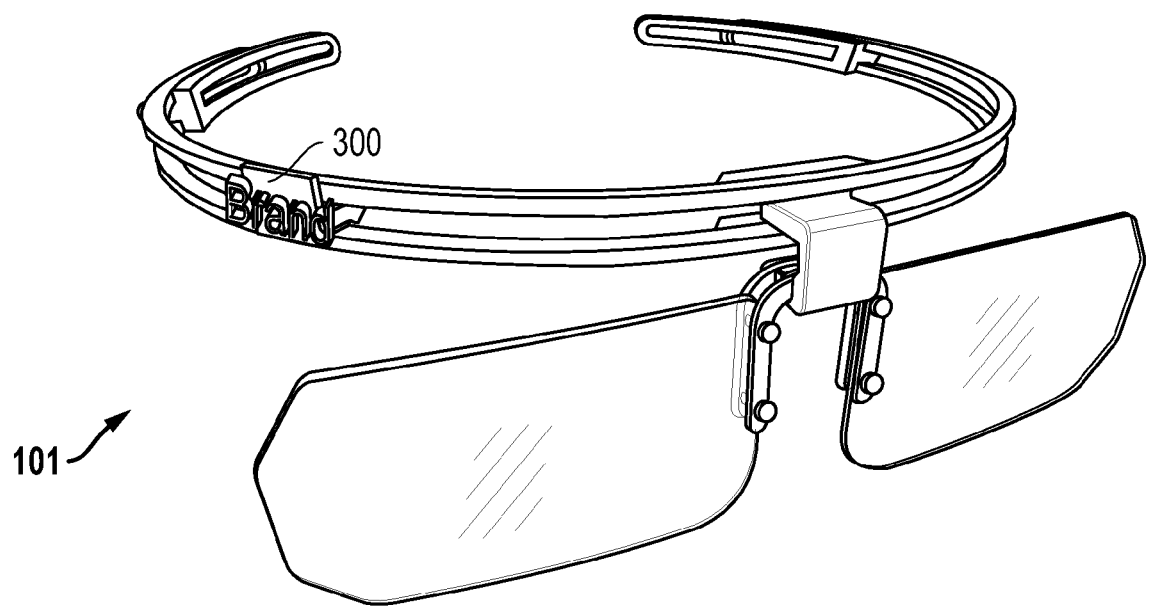
FIG. 44 is an isometric view of an embodiment of an attachment attached to eyewear in operation.

FIG. 43 depicts an alternate embodiment of an attachment 300 for eyewear. In this version, frame 301 is horizontally disposed, such that an enlarged end 304 or insert 303 protrudes from the back side of frame 301, as shown. The display 305 may be mounted to a front side of frame 301 in manner similar to those described herein. In operation (FIG. 44), the frame 301 and enlarged end 304 of insert 303 extend through the frame of eyewear 101 to engage and retain attachment 300 thereto.

Figure 45:
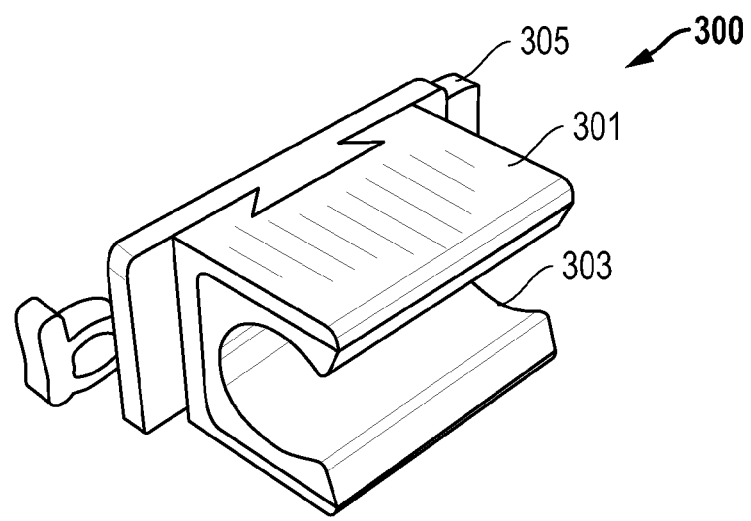
FIG. 45 is an isometric view of another embodiment of an attachment for eyewear.
Figure 46:
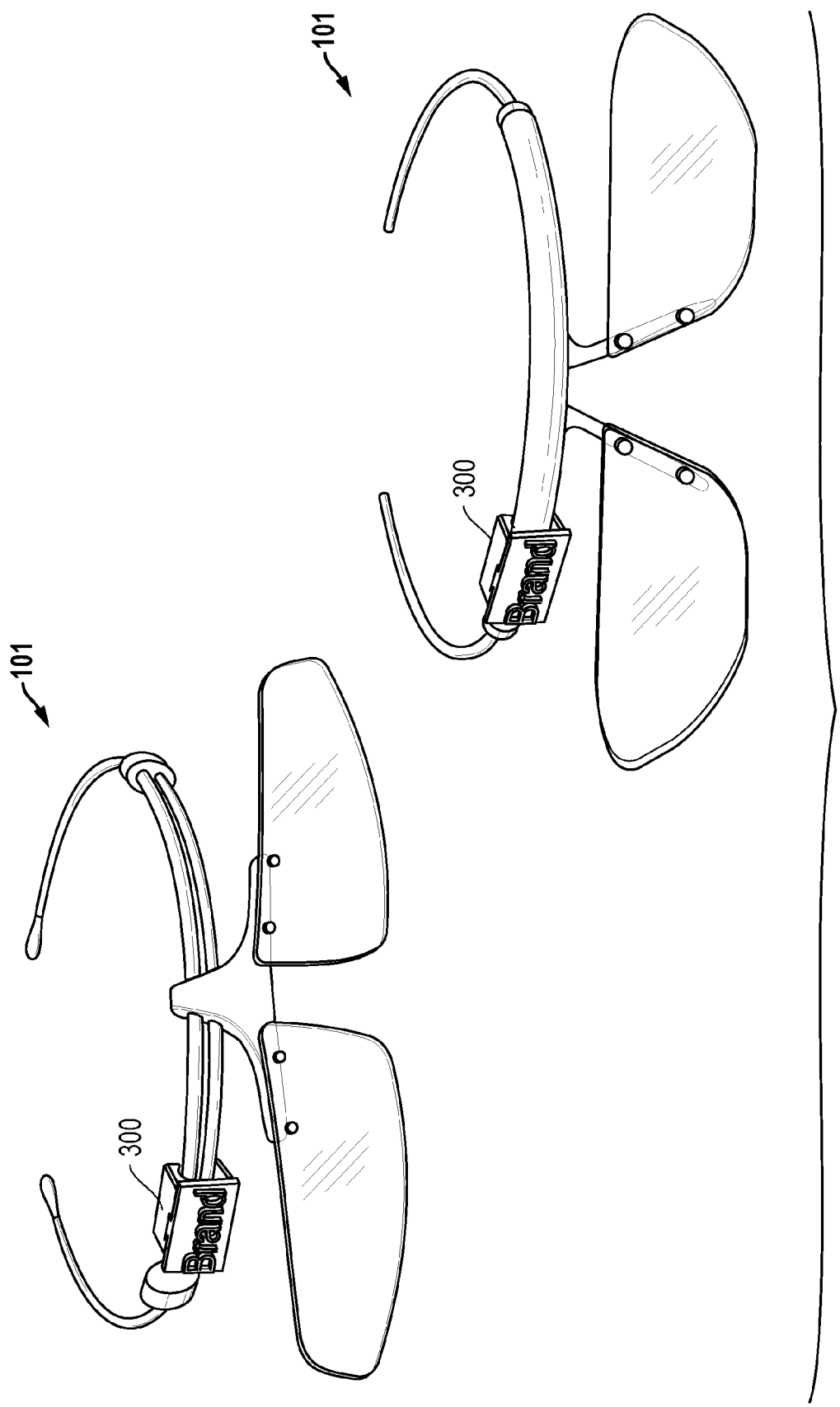
FIG. 46 depicts isometric views of still another embodiment of an attachment for eyewear in operation.

FIGS. 45 and 46 illustrate another embodiment of an attachment 300 for eyewear 101. In this version, the frame 301 may be provided with a c-shaped sectional design that receives insert 303, which has a complementary shape. The display 305 may be mounted to the front side of frame 301 as described herein. The elastic opening in insert 303 may mount to the exterior surface of the frames of eyewear 101 as shown.

In still other embodiments, one or more materials may be affixed or integrated onto the eyewear (e.g., on the temples) to make the eyewear buoyant in water. For example, elements may slide onto the back two open tips of the temples of the frames to make the eyewear float in the event that they were accidentally dropped in water.

This device is configured and designed to be used as a way to suspend optical lenses in front of a person's eyes. The band was designed to fit snugly around the user's head and obviates the need for the ears and nose and nasal bridge for placement, support and comfortable wear by the user. In some embodiments, the frame and lens are free of contact with the nose of the user, and the temples rest on the ears of the user, such as for uses involving active or sporting activities.

The band may be formed from a polyamide plastic (e.g., nylon) to allow for superior strength while still offering flexibility. Various embodiments may comprise other supportive materials known in the art. The lenses may be prescription or non-prescription, and may be attached directly to the band frame. The design of the lens is not limited to any shape, form, tint or embodiment.

The band frame has a molded channel that allows a corresponding molded tongue on the lens to slide onto the band quickly and easily. The lens attachment design allows the user the ability and versatility to change to different colored band and/or different prescription or non-prescription lenses quickly and easily. The molded interface on the lens prevents it from being pushed too far inward into the frame. The side view of the frame illustrated the molded sliding tongue and groove for the lens connection.

In some embodiments, there are two main components. The first component comprises the band frame. The frames may be made of but not limited to nylon, in the polyamide family of thermoplastic resins, but is not limited to such, and any such embodiment may be comprised of any material, color, texture and/or adjustable component. Most similar properties between different grades of nylon include high toughness, impact resistance good strength and still allowing good flexibility. It is a very wear resistant material. The second component may comprise the single lens or double lenses.

The band frame may be provided with a molded channel that allows a corresponding molded sliding tongue on the single and/or double lens design, which connects to a corresponding groove on the band frame for connection. Any connection described may include but not be limited to any of the various embodiments to secure the single and/or double lens design in the frame. The molded interference on each side of the two lens designs prevents it from being pushed too far inward into the frame. The lenses are attached so as to be suspended in front of a person's eyes.

This is an innovative alternative to traditional spectacle correction and is designed for use as a way to suspend optical lenses in front of a person's eyes. The band frame is designed to fit snugly around an adult or child's head and eliminates the need for the ears and nose to wear comfortably. The band frame has a universal design to fit for both children and adults. However it is not limited to any particular embodiment and adjustable component. The lens attachment design allows the user great versatility and the ability to change to different colored bands and/or different single and/or double lens attachments quickly and easily.

The lenses also may be formed from polycarbonate (PC), a thermoplastic resin, which is a heat-softened and cool rehardened material. This material can be easily injection molded thermoformed and/or extruded. PC has a specific gravity of about 1.2. A stainless steel, hot runner, cavity injection mold may manufacture the single and double lens pieces. Process selection may comprise injection molding due to its ability to produce many high quality parts quickly.

The lens attachment design allows for single lenses or double lenses to be able to be placed on the band frame. The lens attachment design allows the user great versatility and the ability to change to different colored bands and/or lenses quickly and easily.

These designs may comprise spectacle wear usages such as recreational or medical devices. They are unique, aesthetically intriguing as well as anatomically and ergonomically advantageous. The designs also eliminate habit of "looking over" eyewear, and poor or non-usage of spectacles in children. The uniqueness promotes increased spectacle compliance; aesthetic design is exciting to children and becomes a versatile accessory for adults; lightweight versatile design; easy to use and has the ability to stay on the user's head comfortably and easily.

Embodiments suspend optical lenses in front of a person's eyes. All glasses on the market today depend on the bridge of the nose as well as the pinna (outer ear) of a person to be held in place. Some children have noses that are not yet fully developed. Children's frames tend to be loose and slip easily due to the child's undeveloped nasal dorsum or bridge of the nose. Another problem with the current eyewear frames for both children and adults is for people born with microtia, or absence of the outer ear. Such conditions make conventional eyewear simply fall off the person's face making glasses extremely difficult if not impossible to wear.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. Eyewear, comprising:
a frame having a forehead bridge, a lens bracket, and a pair of temples;
lenses coupled to the frame, such that the lenses are free of contact with the nose of the user; and
an interior temple mounted to each of said pair of temples, and the interior temples are adjustable relative to said pair of temples; and
the frame comprises a pair of wires that are circular, and the lenses are coupled to the wires.

2. Eyewear according to claim 1, wherein the frame is formed from a metallic material and the interior temples are formed from a material that slidably engages and is resettably fixable to said pair of temples.

3. Eyewear according to claim 1, wherein the lenses are adjustably movable relative to the frame.

4. Eyewear according to claim 1, wherein the lenses are secured to the frame with fasteners.

5. Eyewear according to claim 1, wherein each of the temples terminates in a circular tab.

6. Eyewear according to claim 1, wherein the frame further comprises at least one pad mounted to an inner surface of the frame.

7. Eyewear according to claim 6, wherein the at least one pad comprises at least three pads that are spaced apart from each other, at least two of which are on the temples.

8. Eyewear according to claim 1, wherein the frame comprises a pair of semi-circular wires, the lenses are mounted to the lens bracket joined to and extending from both wires.

9. Eyewear according to claim 8, wherein one of the wires extends with the temples, and the wires are secured to each other with fasteners.

10. Eyewear according to claim 9, wherein each of the wires has a circular sectional shape, and the fasteners are cylindrical in shape.

11. Eyewear, comprising:
a frame having a forehead bridge and a lens bracket joined to and extending from the forehead bridge and a pair of temples; and
lenses mounted to the lens bracket, such that the lenses are free of contact with the nose of the user; and
an interior temple mounted to each of said pair of temples, the interior temples are adjustable relative to said pair of temples, and the interior temples are formed from a material that slidably engages and is resettably fixable to said pair of temples; and
the frame comprises wires that are circular, and the lenses are coupled to the wires.

12. Eyewear according to claim 11, wherein the lenses are adjustably movable relative to the frame.

13. Eyewear according to claim 11, wherein the frame further comprises at least one pad mounted to an inner surface of the frame.

14. Eyewear according to claim 13, wherein the at least one pad comprises at least three pads that are spaced apart from each other, at least two of which are on the temples.

15. Eyewear according to claim 11, wherein there are no hinges between the frame and temples.

16. Eyewear, comprising:
a frame having a forehead bridge, a lens bracket, a pair of semi-circular wires and a pair of temples;
lenses coupled to the frame and mounted to the lens bracket joined to and extending from both wires, such that the lenses are free of contact with the nose of the user; and
an interior temple mounted to each of said pair of temples, and the interior temples are adjustable relative to said pair of temples.

17. Eyewear according to claim 16, wherein the frame is formed from a metallic material and the interior temples are formed from a material that slidably engages and is resettably fixable to said pair of temples.

18. Eyewear according to claim 16, wherein the lenses are adjustably movable relative to the frame.

19. Eyewear according to claim 16, wherein the frame further comprises at least one pad mounted to an inner surface of the frame.

20. Eyewear according to claim 19, wherein the at least one pad comprises at least three pads that are spaced apart from each other, at least two of which are on the temples.

* * * * *